US012248294B2

(12) United States Patent
Hashimoto

(10) Patent No.: US 12,248,294 B2
(45) Date of Patent: Mar. 11, 2025

(54) BACKLASH-AMOUNT MEASUREMENT APPARATUS, BACKLASH-AMOUNT MEASUREMENT METHOD AND COMPUTER READABLE MEDIUM

(71) Applicant: MITSUBISHI ELECTRIC CORPORATION, Tokyo (JP)

(72) Inventor: Shigeru Hashimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 193 days.

(21) Appl. No.: 17/978,352

(22) Filed: Nov. 1, 2022

(65) Prior Publication Data
US 2023/0050374 A1 Feb. 16, 2023

Related U.S. Application Data

(63) Continuation of application No. PCT/JP2020/025226, filed on Jun. 26, 2020.

(51) Int. Cl.
*G05B 19/404* (2006.01)
*H04Q 9/00* (2006.01)

(52) U.S. Cl.
CPC ............. *G05B 19/404* (2013.01); *H04Q 9/00* (2013.01); *G05B 2219/34013* (2013.01)

(58) Field of Classification Search
CPC ........ G05B 19/404; G05B 2219/34013; H04Q 9/00

(Continued)

(56) References Cited

U.S. PATENT DOCUMENTS

2003/0036868 A1* 2/2003 Yutkowitz ............ G05B 19/404
702/105
2018/0373223 A1 12/2018 Ikai et al.
2019/0196439 A1* 6/2019 Sugita ..................... G05B 19/19

FOREIGN PATENT DOCUMENTS

CN 110781854 A 2/2020
JP 60-28751 A 2/1985
(Continued)

OTHER PUBLICATIONS

Kojima et al. (WO 2009104676 A1) Backlash Quantity Detecting Method for Feeding Drive Device, and Backlash Quantity Detecting Device for the Feeding Drive Device (Year: 2009).*

(Continued)

*Primary Examiner* — Jorge L Carrasquillo
(74) *Attorney, Agent, or Firm* — Birch, Stewart, Kolasch & Birch, LLP

(57) ABSTRACT

A rotation control unit performs a rotation process of rotating a servomotor which is connected to a device via a power transmission means. A waveform-data acquisition unit performs a waveform-data acquisition process of acquiring waveform data when the servomotor is rotated. A determination unit performs a determination process of determining whether or not rotation has been transmitted to the device when the servomotor is rotated, based on the waveform data. A calculation unit ends a repetition process of repeating a search process, the search process being constituted by the rotation process, the waveform-data acquisition process, and the determination process, when it is determined that the rotation has been transmitted to the device, and calculates as a backlash amount, a sum of a rotation amount in the repetition process, the rotation amount being an amount by which the rotation control unit has rotated the servomotor in the rotation process.

21 Claims, 14 Drawing Sheets

(58) Field of Classification Search
USPC .......................................................... 318/611
See application file for complete search history.

(56) References Cited

FOREIGN PATENT DOCUMENTS

| | | |
|---|---|---|
| JP | 4-106429 A | 4/1992 |
| JP | 4-362703 A | 12/1992 |
| JP | 9-201745 A | 8/1997 |
| JP | 2000-52178 A | 2/2000 |
| JP | 2002-132310 A | 5/2002 |
| JP | 2019-8472 A | 1/2019 |
| WO | WO 2009/104676 A1 | 8/2009 |

OTHER PUBLICATIONS

Aihara (Jp 2000052178 A)Method and Device for Preventing Backlash of Driving Device (Year: 2000).*
Kawanami (JP H09201745 A) Backlash Amount Deciding Device (Year: 1997).*
Pei (CN 111336241 A) A Method For Eliminating Reducer Rotary Backlash And High Precision Control System And Method (Year: 2020).*
Taiwanese Office Action and Search Report for Taiwanese Application No. 109134108, dated Jun. 5, 2023, with an English translation.
International Search Report (PCT/ISA/210) issued in PCT/JP2020/025226, dated Sep. 24, 2020.
Written Opinion of the International Searching Authority (PCT/ISA/237) issued in PCT/JP2020/025226, dated Sep. 24, 2020.

* cited by examiner

BACKLASH-AMOUNT MEASUREMENT APPARATUS, BACKLASH-AMOUNT MEASUREMENT METHOD AND COMPUTER READABLE MEDIUM

CROSS REFERENCE TO RELATED APPLICATIONS

This application is a Continuation of PCT International Application No. PCT/JP2020/025226, filed on Jun. 26, 2020, which is hereby expressly incorporated by reference into the present application.

TECHNICAL FIELD

The present disclosure relates to a backlash-amount measurement apparatus, an after-learning-learned-model generation apparatus, a learning-purpose-data generation apparatus, a backlash-amount measurement method, an after-learning-learned-model generation method, a learning-purpose-data generation method, a backlash-amount measurement program, an after-learning-learned-model generation program, and a learning-purpose-data generation program.

BACKGROUND ART

When a device is operated by using a servomotor, power of the servomotor is transmitted to the device via a power transmission means having a gear, a belt, a coupling, a joint, and the like. However, backlash such as a gap between the gears exists in the power transmission means, and the power equivalent to the backlash is not transmitted to the device even when the servomotor rotates. Thus, an erroneous difference equivalent to the backlash is caused, between a position of the device expected by a motion controller which controls the device, and an actual position of the device.

In order to correct this erroneous difference, the motion controller has a backlash correction function that does not count a position command equivalent to the backlash as a current position, when a direction of rotation of the servomotor changes. If backlash correction is implemented, a backlash correction amount needs to be set as a parameter of the motion controller in advance.

Conventionally, a backlash amount has been measured by rotating the servomotor manually by a person. However, since it requires an enormous amount of labor, a technique of automatically estimating the backlash amount has been developed. For example, Patent Literature 1 estimates the backlash amount based on correlation data between amplitude from a motor torque command and amplitude from position feedback.

CITATION LIST

Patent Literature

Patent Literature 1: WO2009-104676A

SUMMARY OF INVENTION

Technical Problem

However, a conventional technique estimates as the backlash amount, the amplitude from the position feedback, obtained when a second derivative of the amplitude from the motor torque command is maximum. Therefore, it is necessary to rotate the servomotor for a while even after the gears engage with each other and the power is transmitted to the device. That is, there has been a problem that measurement of the backlash amount takes a long time since not only measurement time until the power is transmitted, but also measurement time after the power is transmitted is necessary.

The present disclosure aims to solve the above-described problem and realizes a backlash-amount measurement apparatus which measures a backlash amount of a power transmission means in a shorter period of time.

Solution to Problem

A backlash-amount measurement apparatus according to the present disclosure includes: a rotation control unit to perform a rotation process of rotating by a certain amount, a servomotor which is connected to a device via a power transmission means; a waveform-data acquisition unit to perform a waveform-data acquisition process of acquiring waveform data obtained when the servomotor is rotated by the certain amount by the rotation control; a determination unit to perform a determination process of determining whether or not rotation has been transmitted to the device when the servomotor is rotated by the certain amount by the rotation control, based on the waveform data acquired by the waveform-data acquisition process; and a calculation unit to cause a repetition process of repeating a search process to be executed, the search process being constituted by the rotation process by the rotation control unit, the waveform-data acquisition process by the waveform-data acquisition unit, and the determination process by the determination unit, when the determination unit determines that the rotation of the servomotor has not been transmitted to the device in the determination process, to end the repetition process when the determination unit determines that the rotation of the servomotor has been transmitted to the device in the determination process, and to calculate as a backlash amount, a sum of a rotation amount in the repetition process, the rotation amount being an amount by which the rotation control unit has rotated the servomotor in the rotation process.

Advantageous Effects of Invention

A backlash-amount measurement apparatus according to the present disclosure includes: a rotation control unit to perform a rotation process of rotating by a certain amount, a servomotor which is connected to a device via a power transmission means; a waveform-data acquisition unit to perform a waveform-data acquisition process of acquiring waveform data obtained when the servomotor is rotated by the certain amount by the rotation control; a determination unit to perform a determination process of determining whether or not rotation has been transmitted to the device when the servomotor is rotated by the certain amount by the rotation control, based on the waveform data acquired by the waveform-data acquisition process; and a calculation unit to cause a repetition process of repeating a search process to be executed, the search process being constituted by the rotation process by the rotation control unit, the waveform-data acquisition process by the waveform-data acquisition unit, and the determination process by the determination unit, when the determination unit determines that the rotation of the servomotor has not been transmitted to the device in the determination process, to end the repetition process when the determination unit determines that the rotation of the servomotor has been transmitted to the device in the determination process, and to calculate as a backlash amount, a sum of a rotation amount in the repetition process, the rotation amount being an amount by which the rotation control unit has rotated the servomotor in the rotation process. Hence, the backlash-amount measurement apparatus determines whether or not the rotation of the servomotor has been transmitted to the device, each time the servomotor is rotated by the certain amount, and calculates the backlash amount at a time when it is determined that the rotation of the servomotor is transmitted to the device. Therefore, it is unnecessary to rotate the servomotor after the power is transmitted, and it is possible to calculate the backlash amount in a shorter period of time.

DESCRIPTION OF EMBODIMENTS

First Embodiment

Figure 1:
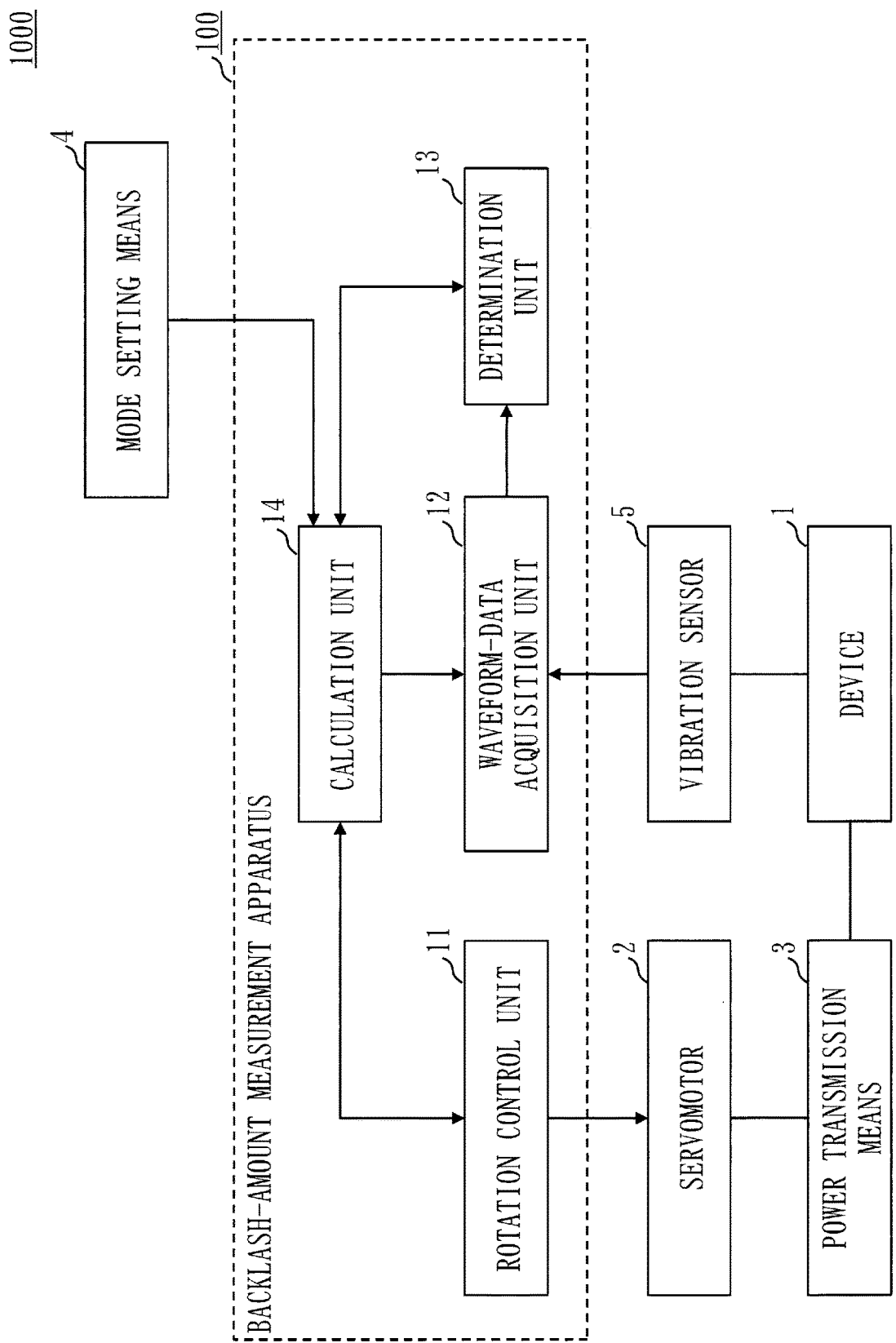
FIG. 1 is a configuration diagram illustrating configurations of an FA system 1000 and a backlash-amount measurement apparatus 100 according to a first embodiment.

FIG. 1 is a configuration diagram illustrating configurations of an FA (Factory Automation) system 1000 and a backlash-amount measurement apparatus 100 according to a first embodiment.

The FA system 1000 is production equipment for products and includes the backlash-amount measurement apparatus 100, a device 1, a servomotor 2, a power transmission means 3, a mode setting means 4, and a vibration sensor 5.

The device 1 is a machine which actually produces products, and operates by power transmitted from the servomotor 2 via the power transmission means 3.

The servomotor 2 is connected to the device 1 via the power transmission means, rotates according to input electric power, and transmits the power to the device 1. Further, the servomotor 2 rotates according to a control instruction input from the backlash-amount measurement apparatus 100. The configuration of the backlash-amount measurement apparatus 100 will be described later. Further, the servomotor 2 is connected to a servo amplifier (not illustrated) which amplifies the electric power input from a power supply (not illustrated).

The power transmission means 3 transmits the power of the servomotor 2 to the device 1 and is constituted by a gear, a ball screw, a belt, and the like. There exists backlash such as a gap between the gears in the power transmission means 3.

The mode setting means 4 is for the user to input into the backlash-amount measurement apparatus 100, a mode signal indicating an operation mode. A keyboard and the like are adopted as the mode setting means 4.

The vibration sensor 5 detects vibration of the device 1 and outputs to the backlash-amount measurement apparatus 100, vibration data indicating the vibration of the device 1. Further, the vibration sensor 5 is assumed to be connected to the device 1.

The backlash-amount measurement apparatus 100 measures a backlash amount of the power transmission means 3 and includes a rotation control unit 11, a waveform-data acquisition unit 12, a determination unit 13, and a calculation unit 14. Further, in the first embodiment, the backlash-amount measurement apparatus 100 also serves as a programmable logic controller which controls a regular production operation of the device 1.

The rotation control unit 11 performs rotation control to rotate the servomotor 2, that is, the rotation control unit 11 is a motion controller for the servomotor 2. In the first embodiment, the rotation control unit 11 performs a rotation process of rotating by a certain amount, the servomotor 2 which is connected to the device 1 via the power transmission means 3. Further, each time the rotation process is performed, the rotation control unit 11 outputs to the calculation unit 14, rotation-amount information indicating the rotation amount by which the servomotor 2 has been rotated.

Here, the certain amount by which the rotation control unit 11 rotates the servomotor 2 is preferably smaller than the backlash amount of the power transmission means 3. This certain amount may be decided based on a rule of thumb, or the backlash amount may be measured at a time of initial setting of the production equipment in advance, and then a value equal to or smaller than the backlash amount may be adopted.

The waveform-data acquisition unit 12 acquires waveform data obtained when the servomotor 2 rotates. In the first embodiment, the waveform-data acquisition unit 12 performs a waveform-data acquisition process of acquiring the waveform data obtained when the servomotor 2 is rotated by the certain amount by the rotation process. Here, the waveform data indicates changes over time in amplitude, and is vibration data or sound data, for example. In the first embodiment, the waveform-data acquisition unit 12 acquires the vibration data from the vibration sensor 5, as the waveform data.

The determination unit 13 determines whether or not the rotation of the servomotor 2 has been transmitted to the device 1, based on the waveform data. In the first embodiment, the determination unit 13 performs a determination process of determining whether or not the rotation has been transmitted to the device 1 when the servomotor 2 is rotated by the certain amount by the rotation process, based on the waveform data.

Further, in the first embodiment, the determination unit 13 determines that the rotation of the servomotor 2 has been transmitted to the device 1, when the amplitude of the waveform indicated in the waveform data is equal to or larger than a first threshold value and the waveform indicated in the waveform data continues for a period of time equal to or longer than a second threshold value. Here, determination as to whether or not the waveform continues for the period of time equal to or longer than the second threshold value is realized by for example, generating an envelope of the waveform and determining whether or not a period of time when amplitude of the generated envelope is equal to or larger than a certain threshold value is equal to or longer than the second threshold value.

Here, each threshold value may be set by a designer based on a rule of thumb, or each threshold value may be set performing the rotation process and the waveform-data acquisition process at an initial time of adjusting the FA system 1000, and using the waveform data obtained at that time. Alternatively, each threshold value may be decided using the amplitude, duration, and the amplitude of the envelope in the waveform data in the first rotation process at a time of backlash-amount measurement.

The calculation unit 14 calculates as the backlash amount of the power transmission means 3, the rotation amount of the servomotor 2 generated from a time when the rotation control unit 11 starts rotating the servomotor 2 until a time when the determination unit 13 determines that the rotation of the servomotor 2 has been transmitted to the device 1. More specifically, in the first embodiment, a calculation unit 14 causes a repetition process of repeating a search process to be executed, the search process being constituted by the rotation process by the rotation control unit 11, the waveform-data acquisition process by the waveform-data acquisition unit 12, and the determination process by the determination unit 13, when the determination unit 13 determines that the rotation of the servomotor 2 has not been transmitted to the device 1 in the determination process, ends the repetition process when the determination unit 13 determines that the rotation of the servomotor 2 has been transmitted to the device 1 in the determination process, and calculates as a backlash amount of the power transmission means 3, a sum of a rotation amount in the repetition process, the rotation amount being an amount by which the rotation control unit 11 has rotated the servomotor 2 in the rotation process.

Here, the calculation unit 14 calculates the rotation amount of the servomotor 2 by adding up the rotation amount indicated in the rotation-amount information input from the rotation control unit 11, using a built-in adding-up means. Further, the sum of the rotation amount is a rotation amount after resetting the adding-up means to zero. That is, when the sum of the rotation amount is referred to, the rotation amount before resetting the adding-up means to zero is not taken into consideration.

Further, the calculation unit 14 employs waiting time between each search process. Therefore, in an occasion when the calculation unit 14 executes the repetition process, the calculation unit 14 causes the next search process to be executed after a waiting for a certain period of time predetermined subsequent to the previously performed search process. This is because if the next rotation process is performed before the vibration of the device 1 converges, the amplitude of the waveform and the change over time are not measured accurately and whether or not the power has been transmitted to the device 1 cannot be determined accurately.

Further, the calculation unit 14 also serves as a mode decision unit which decides the operation mode based on the mode signal input from the mode setting means 4. Here, the operation mode is a production mode for the device 1 to perform the regular production operation or a backlash-amount measurement mode for measuring the backlash amount of the power transmission means 3. Below, mainly a backlash auto-adjustment mode will be described.

Figure 2:
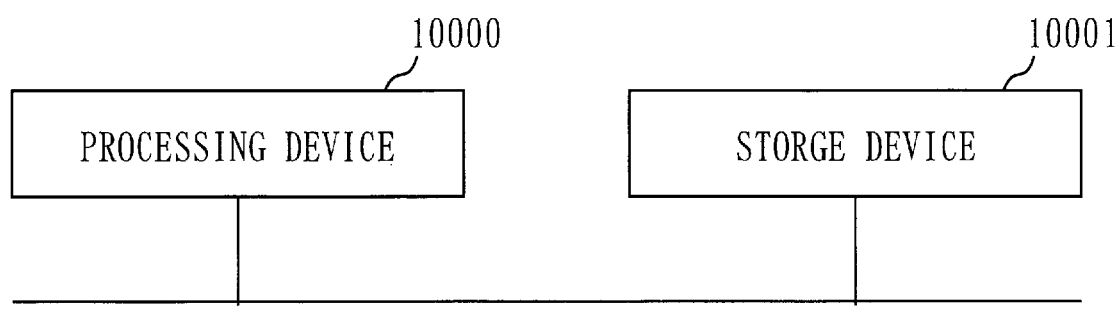
FIG. 2 is a configuration diagram illustrating an example of a hardware configuration of a computer which realizes the backlash-amount measurement apparatus 100, according to the first embodiment.

Next, a hardware configuration of the backlash-amount measurement apparatus 100 according to the first embodiment will be described. Each function of the backlash-amount measurement apparatus 100 is realized by a computer. FIG. 2 is a configuration diagram illustrating an example of a hardware configuration of the computer which realizes the backlash-amount measurement apparatus 100, according to the first embodiment.

Hardware illustrated in FIG. 2 includes a processing device 10000 such as a CPU (Central Processing Unit), and a storage device 10001 such as a ROM (Read Only Memory) or a hard disk.

The rotation control unit 11, the waveform-data acquisition unit 12, the determination unit 13, and the calculation unit 14 which are illustrated in FIG. 1 are realized by the processing device 10000 executing a program stored in the storage device 10001. Here, the above-described configuration is not limited to a configuration realized by a single processing device 10000 and a single storage device 10001, and may be a configuration realized by a plurality of processing devices 10000 and a plurality of storage devices 10001.

Further, a method of realizing each function of the backlash-amount measurement apparatus 100 is not limited to the above-described combination of hardware and program, and may be realized by only hardware such as an LSI (Large Scale Integrated Circuit) obtained by implementing the program in the processing device. Alternatively, a part of the functions may be realized by dedicated hardware, and the other part of the functions may be realized by a combination of processing device and program.

The backlash-amount measurement apparatus 100 according to the first embodiment is constituted as above.

Next, an operation of the backlash-amount measurement apparatus 100 according to the first embodiment will be described.

Figure 3:
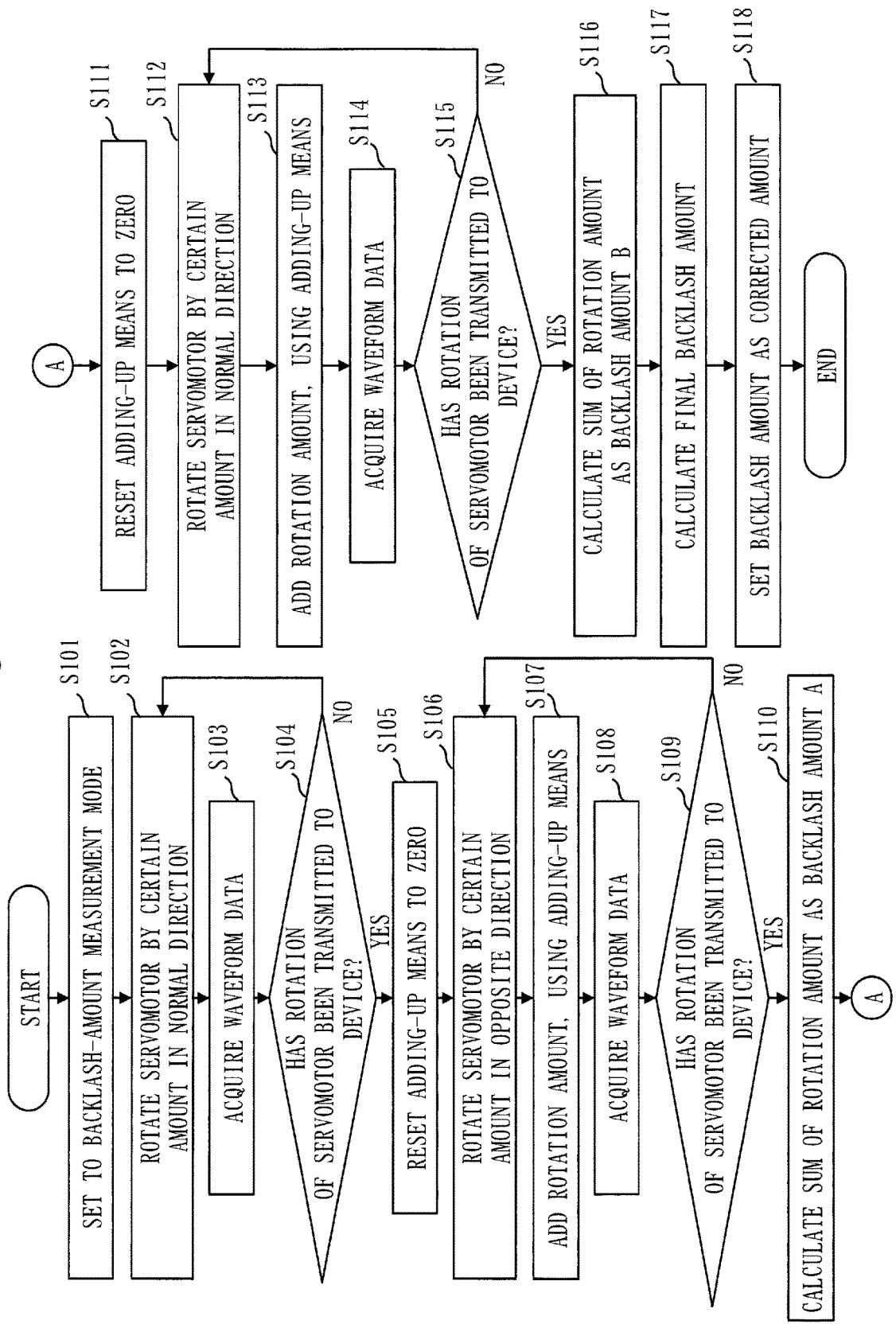
FIG. 3 is flowcharts illustrating an operation of the backlash-amount measurement apparatus 100 according to the first embodiment.

FIG. 3 is flowcharts illustrating the operation of the backlash-amount measurement apparatus 100 according to the first embodiment.

Further, below, the operation of the backlash-amount measurement apparatus 100 corresponds to a backlash-amount measurement method, and the program which causes the computer to execute the operation of the backlash-amount measurement apparatus 100 corresponds to a backlash-amount measurement program. Further, an operation of the rotation control unit 11 corresponds to a rotation control step, an operation of the waveform-data acquisition unit 12 corresponds to a waveform-data acquisition step, an operation of the determination unit 13 corresponds to a determination step, and an operation of the calculation unit 14 corresponds to a calculation step.

First, in step S101, a user sets the backlash-amount measurement apparatus 100 to the backlash-amount measurement mode, using the mode setting means 4. Upon receiving from the mode setting means 4, a control signal indicating that the mode is set to the backlash-amount measurement mode, the calculation unit 14 causes below-described initial position setting to be executed.

In step S102, the rotation control unit 11 rotates the servomotor 2 by the certain amount in a normal direction.

In step S103, the waveform-data acquisition unit 12 acquires from the vibration sensor 5, vibration data obtained by detecting vibration of the device 1 when the servomotor 2 is rotated by the certain amount in step S101. The waveform-data acquisition unit 12 outputs the acquired vibration data to the determination unit 13.

In step S104, the determination unit 13 determines whether or not the rotation of the servomotor 2 has been transmitted to the device 1, based on the input vibration data. More specifically, the determination unit 13 monitors the input vibration data and determines whether or not the amplitude is equal to or larger than the first threshold value and the waveform continues for the period of time equal to or longer than the second threshold value. When the determination unit 13 determines that the rotation of the servomotor 2 has not been transmitted to the device 1, the process returns to step S102 after a waiting for the certain period of time, and the rotation control unit 11 rotates the servomotor 2 by the certain amount in the normal direction again. When the determination unit 13 determines that the rotation of the servomotor 2 has been transmitted to the device 1, the process proceeds to step S105, and the calculation unit 14 resets the built-in adding-up means to zero.

The above-described processes from step S102 to step S105 are the initial position setting, and also processes of setting the adding-up means to zero in a state where gears of the power transmission means 3 engage with each other, as preparation for the measurement of the backlash amount.

After an end of the initial position setting and a subsequent waiting for the certain period of time, the rotation control unit 11 rotates the servomotor 2 by a certain amount in an opposite direction in step S106. Further, the rotation control unit 11 outputs to the calculation unit 14, the rotation-amount information indicating the rotation amount by which the servomotor 2 has been rotated.

In step S107, the calculation unit 14 adds the rotation amount to the adding-up means based on the input rotation-amount information.

In step S108, the waveform-data acquisition unit 12 acquires from the vibration sensor 5, the vibration data obtained by detecting the vibration of the device 1 when the servomotor is rotated by the certain amount in step S106. The waveform-data acquisition unit 12 outputs the acquired vibration data to the determination unit 13.

In step S109, the determination unit 13 determines whether or not the rotation of the servomotor 2 has been transmitted to the device 1, based on the input vibration data. More specifically, the determination unit 13 monitors the input vibration data and determines whether or not the amplitude is equal to or larger than the first threshold value and the waveform continues for the period of time equal to or longer than the second threshold value. When the determination unit 13 determines that the rotation of the servomotor 2 has not been transmitted to the device 1, the process returns to step S106 after a waiting for the certain period of time, and the servomotor 2 is rotated by the certain amount in the opposite direction again. When the determination unit 13 determines that the rotation of the servomotor 2 has been transmitted to the device 1, the process proceeds to step S110, and the calculation unit 14 reads the adding-up means and calculates the sum of the rotation amount of the servomotor 2 as a backlash amount A.

Here, with use of FIG. 4, specific examples of processes from step S106 to step S110 will be described.

Figure 4:
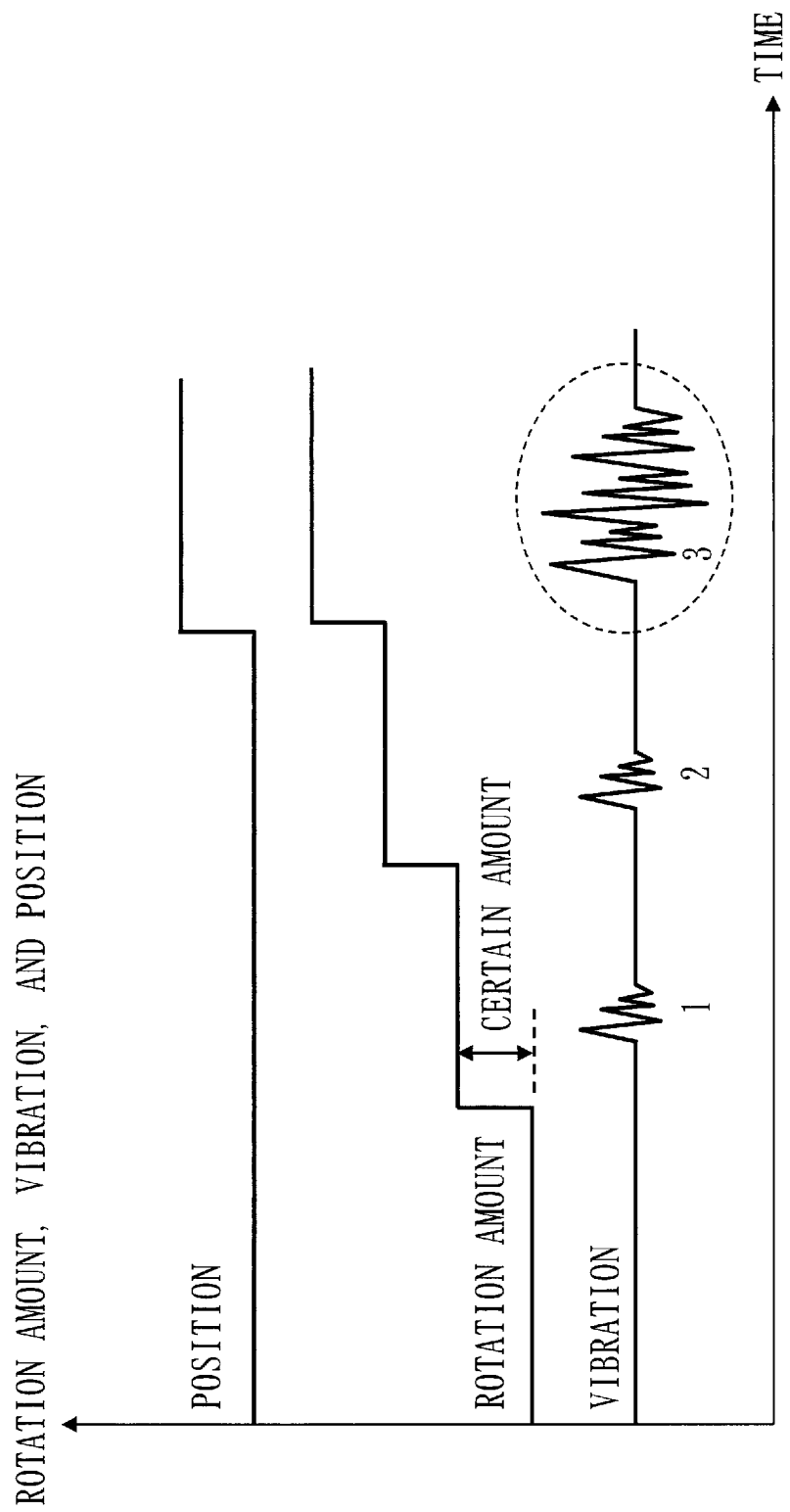
FIG. 4 is a conceptual diagram for explaining a specific example of the operation of the backlash-amount measurement apparatus 100 according to the first embodiment.

FIG. 4 is a conceptual diagram for explaining a specific example of the operation of the backlash-amount measurement apparatus 100 according to the first embodiment.

In FIG. 4, when the rotation of the servomotor 2 is increased by a fixed amount each time, from a state of standstill, a position of a movable portion of the device 1 does not change unless the power of the servomotor 2 is transmitted to the device 1. Therefore, the amplitude of the vibration is small like the first and second times of addition of the rotation amount in FIG. 4, and a period of time of the vibration is short. At the third time of the addition of the rotation amount, since the power of the servomotor 2 is transmitted to the device 1, the position of the movable portion of the device 1 changes, and the device 1 itself vibrates. Therefore, compared with the first and second times, the amplitude in the vibration data is larger, and the period of time until the vibration converges is longer. The determination unit 13 determines whether or not the power of the servomotor 2 has been transmitted to the device 1 via the power transmission means 3, by recognizing such changes in the vibration.

Returning to FIG. 3, descriptions of the subsequent operation will be given.

Although, it is possible to terminate the operation after the above-described processes, the backlash-amount measurement apparatus 100 according to the first embodiment calculates the backlash amounts both in the normal direction and the opposite direction and calculates an average of these amounts as a final backlash amount in order to reduce errors in the measurement. The processes described above are the operation of measuring the backlash amount in the opposite direction, and below, descriptions will continue regarding an operation of measuring the backlash amount in the normal direction.

In step S111, the calculation unit 14 resets the built-in adding-up means to zero.

In step S112, the rotation control unit 11 rotates the servomotor 2 by the certain amount in the normal direction. Further, the rotation control unit 11 outputs to the calculation unit 14, the rotation-amount information indicating the rotation amount by which the servomotor 2 has been rotated.

In step S113, the calculation unit 14 adds the rotation amount to the adding-up means based on the input rotation-amount information.

In step S114, the waveform-data acquisition unit 12 acquires from the vibration sensor 5, vibration data obtained by detecting the vibration of the device 1 when the servomotor 2 is rotated by the certain amount in step S111. The waveform-data acquisition unit 12 outputs the acquired waveform data to the determination unit 13.

In step S115, the determination unit 13 determines whether or not the rotation of the servomotor 2 has been transmitted to the device 1, based on the input vibration data. More specifically, the determination unit 13 monitors the input vibration data and determines whether or not the amplitude is equal to or larger than the first threshold value and the waveform continues for the period of time equal to or longer than the second threshold value. When the determination unit 13 determines that the rotation of the servomotor 2 has not been transmitted to the device 1, the process returns to step S112 after a waiting for the certain period of time, and the servomotor 2 is rotated by the certain amount in the normal direction again. When the determination unit 13 determines that the rotation of the servomotor 2 has been transmitted to the device 1, the process proceeds to step S116, and the calculation unit 14 reads the adding-up means and records the sum of the rotation amount of the servomotor 2 as a backlash amount B.

In step S117, the calculation unit 14 calculates an average value of the backlash amount A and the backlash amount B, as the final backlash amount.

In step S118, the calculation unit 14 sets the calculated backlash amount as a corrected amount, in the rotation control unit 11.

By the above-described operation, the backlash-amount measurement apparatus 100 according to the first embodiment determines whether or not the rotation of the servomotor 2 has been transmitted to the device 1, each time the servomotor 2 is rotated by the certain amount, and the backlash-amount measurement apparatus 100 calculates the backlash amount at a time when it is determined that the rotation of the servomotor 2 has been transmitted to the device 1. Therefore, it is unnecessary to rotate the servomotor 2 after the power is transmitted, and it is possible to calculate the backlash amount in a shorter period of time.

Further, the backlash-amount measurement apparatus 100 according to the first embodiment determines that the rotation of the servomotor 2 has been transmitted to the device 1, when the amplitude of the waveform indicated in the waveform data is equal to or larger than the first threshold value and the waveform indicated in the waveform data continues for the period of time equal to or longer than the second threshold value. Therefore, it is possible to determine whether or not the power has been transmitted, based on rules. Hence, a designer and a user can set the threshold values as necessary, which enables handling various types of situations flexibly.

Further, the backlash-amount measurement apparatus 100 according to the first embodiment acquires as the waveform data, the vibration data indicating the vibration of the device 1, detected by the vibration sensor 5 connected to the device 1. Therefore, it is possible to acquire the waveform data which includes less noise from a surrounding environment, and measure the backlash amount highly accurately.

Further, in the above, the servomotor 2 is rotated in the normal direction first to perform the initial position setting, and then the first search process is performed in the opposite direction. However, the servomotor 2 may be rotated in the opposite direction first to perform the initial position setting, and then the first search process may be performed in the normal direction.

Second Embodiment

Next, a backlash-amount measurement apparatus 200 according to a second embodiment will be described.

In the first embodiment, the backlash-amount measurement apparatus 100 waits for the predetermined certain period of time after the servomotor 2 is rotated once. Meanwhile, the second embodiment describes the backlash-amount measurement apparatus 200 which measures duration of the waveform indicated in the waveform data, sets this duration as the waiting time, and measures the backlash amount in a shorter period of time. Below, mainly matters different from the first embodiment will be described.

Figure 5:
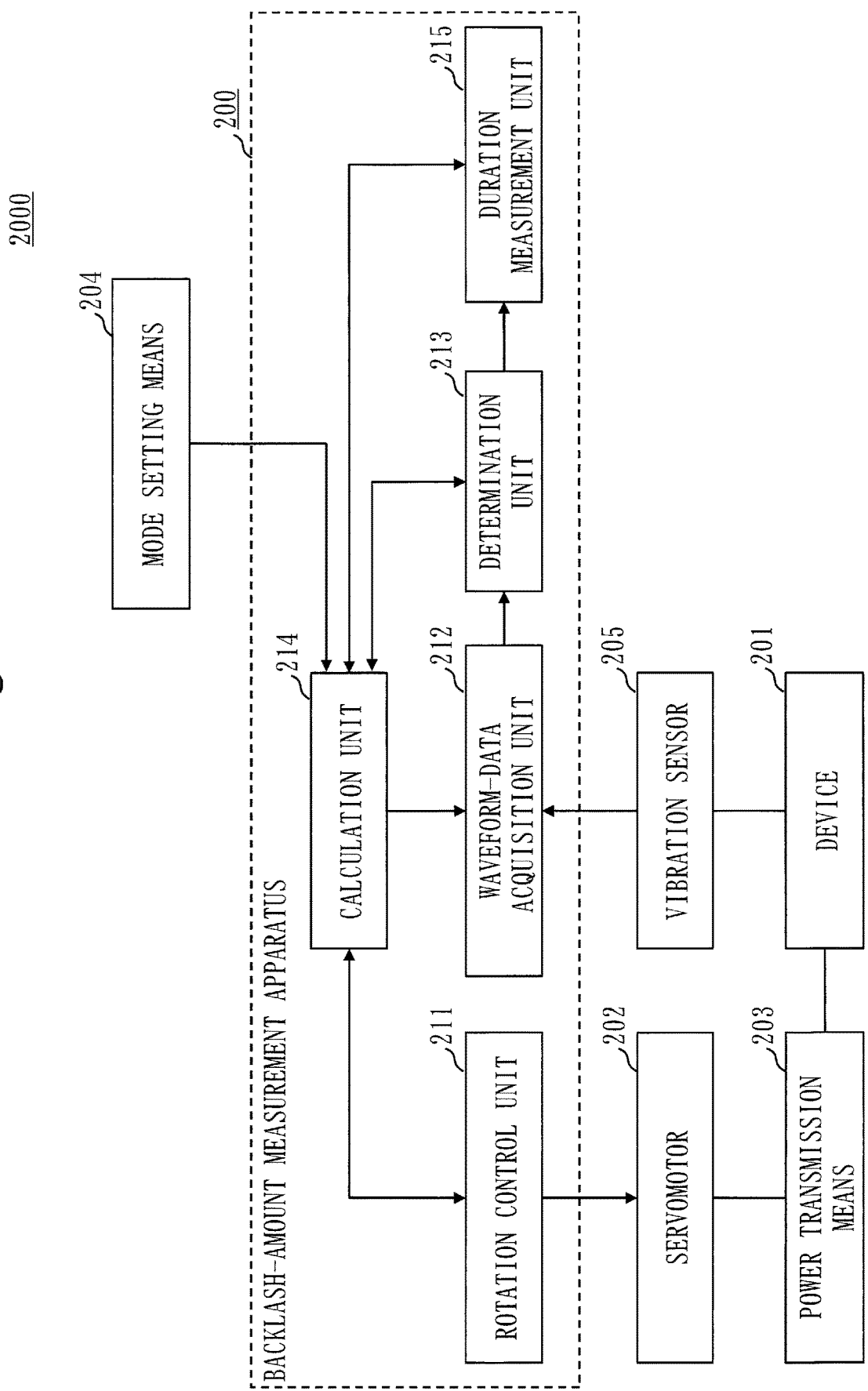
FIG. 5 is a configuration diagram illustrating configurations of an FA system 2000 and a backlash-amount measurement apparatus 200 according to a second embodiment

FIG. 5 is a configuration diagram illustrating configurations of an FA system 2000 and the backlash-amount measurement apparatus 200 according to the second embodiment. The FA system 2000 is production equipment for products and includes the backlash-amount measurement apparatus 200, a device 201, a servomotor 202, a power transmission means 203, a mode setting means 204, and a vibration sensor 205. Further, the backlash-amount measurement apparatus 200 includes a rotation control unit 211, a waveform-data acquisition unit 212, a determination unit 213, a calculation unit 214, and a duration measurement unit 215.

Here, in addition to the production mode and the backlash-amount measurement mode, a waveform-duration measurement mode is added as the operation mode of the backlash-amount measurement apparatus 200.

Further, the duration measurement unit 215 is added as the configuration of the backlash-amount measurement apparatus 200. The duration measurement unit 215 measures the duration of the waveform indicated in the waveform data when the determination unit 213 determines that the rotation of the servomotor 202 has not been transmitted to the device 201. Here, a process that the duration measurement unit 215 measures the duration of the waveform is referred to as a duration measurement process.

Further, the calculation unit 214 according to the second embodiment sets the duration measured by the duration measurement unit 215 as the waiting time after the search process is executed and until the next search process is executed, in the repetition process.

That is, after the servomotor 202 rotates by the certain amount, the calculation unit 214 executes the next search process immediately after an elapse of the duration of the waveform measured by the duration measurement unit 215. In other words, after the servomotor 202 rotates by the certain amount, the next search process is not executed until after the elapse of the duration of the waveform measured by the duration measurement unit 215.

Since the other configurations are the same as those in the first embodiment, descriptions will be omitted. Also, a hardware configuration is the same as that in the first embodiment. As with the other units, the duration measurement unit 215 is also realized by the processing device executing the program stored in the storage device.

Next, with use of FIG. 6, an operation of the backlash-amount measurement apparatus 200 according to the second embodiment will be described.

Figure 6:
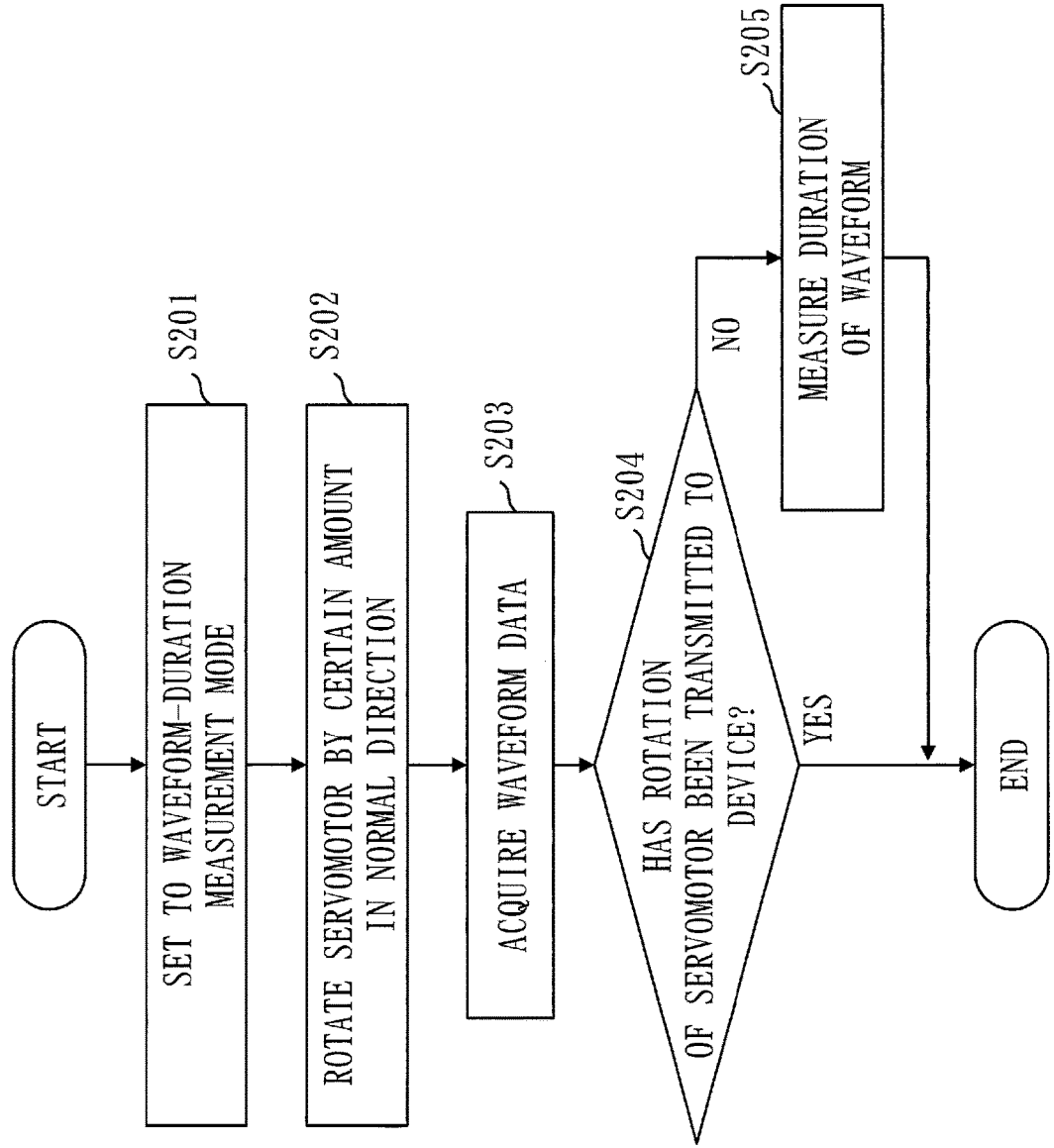
FIG. 6 is a flowchart illustrating an operation of measuring duration of a waveform by the backlash-amount measurement apparatus 200, according to the second embodiment.

FIG. 6 is a flowchart illustrating an operation of measuring the duration of the waveform by the backlash-amount measurement apparatus 200, according to the second embodiment.

First, in step S201, the user sets the backlash-amount measurement apparatus 200 to the waveform-duration measurement mode, using the mode setting means 204. After the waveform-duration measurement mode is set, the calculation unit 214 causes the rotation control unit 211 to execute the rotation process.

In step S202, the rotation control unit 211 rotates the servomotor 202 by the certain amount in the normal direction.

In step S203, the waveform-data acquisition unit 212 acquires from the vibration sensor 5, vibration data obtained by detecting the vibration of the device 201 when the servomotor 202 is rotated by the certain amount in step S202. The waveform-data acquisition unit 212 outputs the acquired vibration data to the determination unit 213 and the duration measurement unit 215.

In step S204, the determination unit 213 determines whether or not the rotation of the servomotor 202 has been transmitted to the device 201, based on the input vibration data. More specifically, the determination unit 213 monitors the input vibration data and determines whether or not the amplitude is equal to or larger than the first threshold value and the waveform continues for the period of time equal to or longer than the second threshold value. When the determination unit 213 determines that the rotation of the servomotor 202 has not been transmitted to the device 201, the process proceeds to step S205. When the determination unit 213 determines that the rotation of the servomotor 202 has been transmitted to the device 201, the process ends.

When it is determined as NO in step S204, the duration measurement unit 215 measures the duration of the input waveform data and outputs to the calculation unit 214, the duration information indicating the measured duration, in step S205. The calculation unit 214 sets the duration indicated in the input duration information, as the waiting time between each search process. After step S205, an operation of a backlash-amount measurement apparatus 200 ends.

Since the backlash-amount measurement apparatus 200 measures the duration of the waveform and sets the duration as the waiting time between each search process by the above-described operation, it is possible to measure the backlash amount in a shorter period of time.

Effect of the backlash-amount measurement apparatus 200 according to the second embodiment will be described in more detail.

When the servomotor 202 is rotated once and then the next rotation is started before the vibration of the device 201 converges, the next vibration may overlap the previous vibration. In such a situation, it is unlikely to be able to accurately determine whether or not the rotation of the servomotor 202 has been transmitted to the device 201 based on the vibration data. Therefore, in the first embodiment, a certain period of time is set in advance, and the next search process being the rotation process is not performed until the certain period of time elapses. Meanwhile, the backlash-amount measurement apparatus 200 according to the second embodiment sets the duration of the waveform as the waiting time. Consequently, it is possible to eliminate a waiting for an extra period of time and to measure the backlash amount in a shorter period of time. Further, it is possible to avoid a situation where the backlash amount cannot be accurately measured because of too short waiting time set by the designer or the user.

Further, since an operation regarding the backlash-amount measurement after setting the waiting time according to the above is the same as that in the first embodiment, descriptions will be omitted.

Below, a modification example of the backlash-amount measurement apparatus 200 according to the second embodiment will be described.

In the above, the operation of measuring the duration of the waveform is performed separately from the operation of measuring the backlash amount. However, the duration of the waveform may be measured from the waveform data obtained in the first rotation process when the backlash amount is measured.

In step S204 described above, when the determination unit 213 determines that the rotation of the servomotor 202 has been transmitted to the device 201, the operation ends. Alternatively, it is acceptable that the operation does not end and the servomotor 202 is rotated in the opposite direction. Besides, it is also acceptable that the duration of the waveform is measured from the waveform data at that time.

It is further acceptable that the processes from step S102 to step S105 in the first embodiment are executed to perform the initial position setting of the power transmission means 203, before the process proceeds to step S202. It is possible to measure the duration of the waveform more certainly by executing these processes. Further, in the above-described case, in step S202, the servomotor 202 is supposed to be rotated in the opposite direction, not in the normal direction.

Third Embodiment

Next, the backlash-amount measurement apparatus 300 according to a third embodiment will be described.

The backlash-amount measurement apparatuses according to the first and second embodiments use as the waveform data, the vibration data indicating the vibration of a position in the device. Meanwhile, the backlash-amount measurement apparatus 300 according to the third embodiment uses as the waveform data, sound data obtained by detecting operation sound of the device. Below, mainly matters different from the first and second embodiments will be described.

Figure 7:
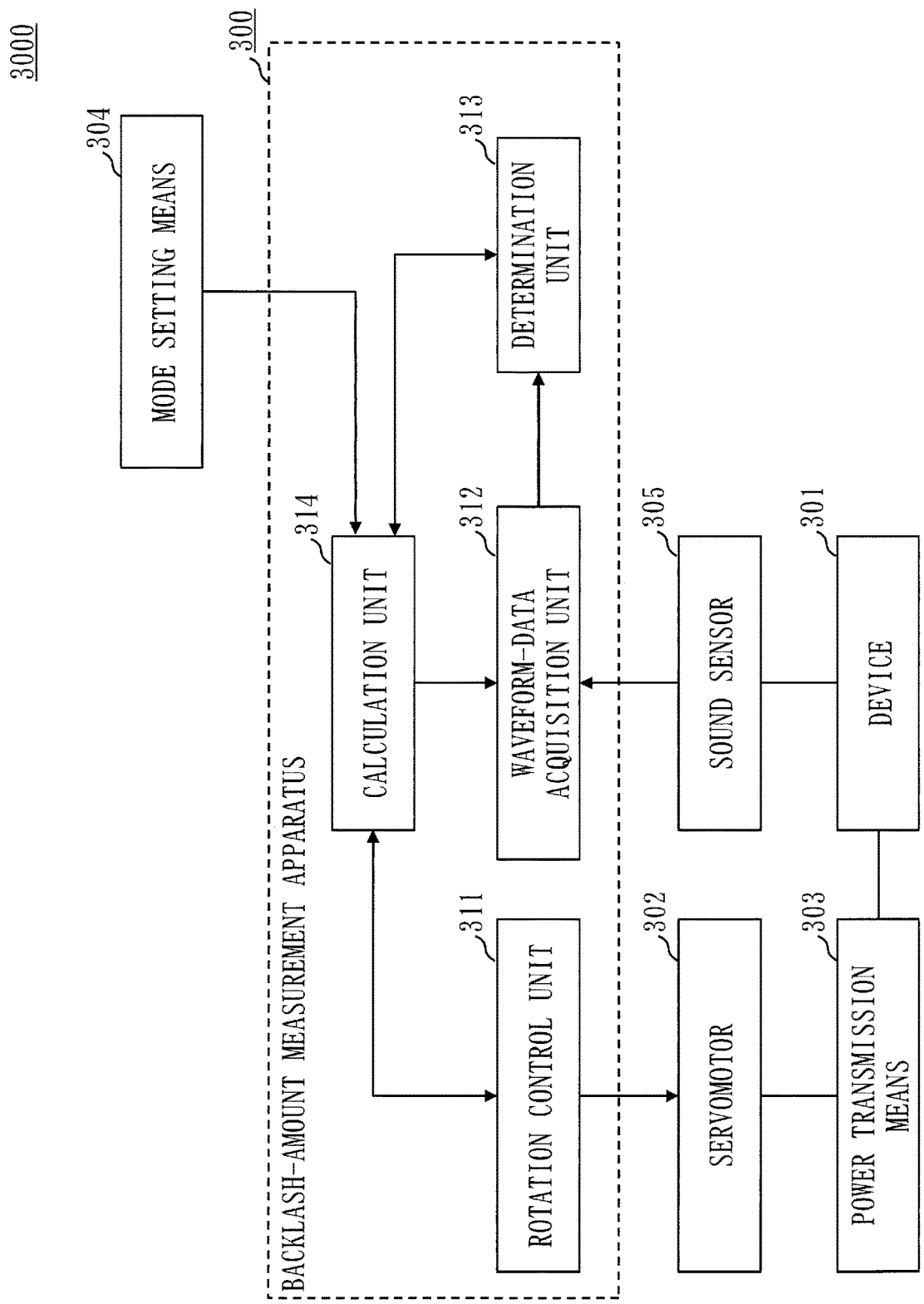
FIG. 7 is a configuration diagram illustrating configurations of an FA system 3000 and a backlash-amount measurement apparatus 300 according to a third embodiment.

FIG. 7 is a configuration diagram illustrating configurations of an FA system 3000 and the backlash-amount measurement apparatus 300 according to the third embodiment.

The FA system 3000 is production equipment for products and includes the backlash-amount measurement apparatus 300, a device 301, a servomotor 302, a power transmission means 303, a mode setting means 304, and a sound sensor 305. Further, the backlash-amount measurement apparatus 300 includes a rotation control unit 311, a waveform-data acquisition unit 312, a determination unit 313, and a calculation unit 314.

The sound sensor 305 is placed in the vicinity of the device 301, detects the operation sound of the device 301, and outputs to the backlash-amount measurement apparatus 300, the sound data indicating the operation sound of the device 301.

In the third embodiment, the waveform-data acquisition unit 312 acquires the sound data from the sound sensor 305, as the waveform data.

Since the other configurations and operations are the same as those in the first embodiment, descriptions will be omitted.

It is possible to measure the backlash amount with a lower cost by using the sound sensor 305 instead of the vibration sensor 5 as described above.

Further, the technique in the second embodiment may be applied to the third embodiment. That is, also in the third embodiment, the backlash-amount measurement apparatus 300 may measure the duration of the sound indicated in the sound data, and set the measured duration as the waiting time between each search process.

Fourth Embodiment

Next, a fourth embodiment will be described.

The above-described backlash-amount measurement apparatuses according to the first to third embodiments automatically measure the backlash amount from the vibration or the sound. Meanwhile, a backlash-amount measurement apparatus 400 will be described which causes a display device to display a warning for the user of the device when the backlash amount is too large to be corrected.

When an element such as a gear, included in the power transmission means has small abrasion and a small backlash amount, the device can be controlled performing the correction. However, when the abrasion becomes large and the backlash amount becomes large, an act of keeping using an operation may lead to a breakdown of the power transmission means. For this reason, the backlash-amount measurement apparatus 400 according to the fourth embodiment sets in advance an upper limit on the backlash amount to be measured, that is the rotation amount of the servomotor. When the backlash amount exceeds this upper limit, the backlash-amount measurement apparatus 400 then ends the measurement of the backlash amount and displays for the user, a notification that the backlash amount exceeds the upper limit.

Below, mainly matters different from the first to third embodiments will be described.

Figure 8:
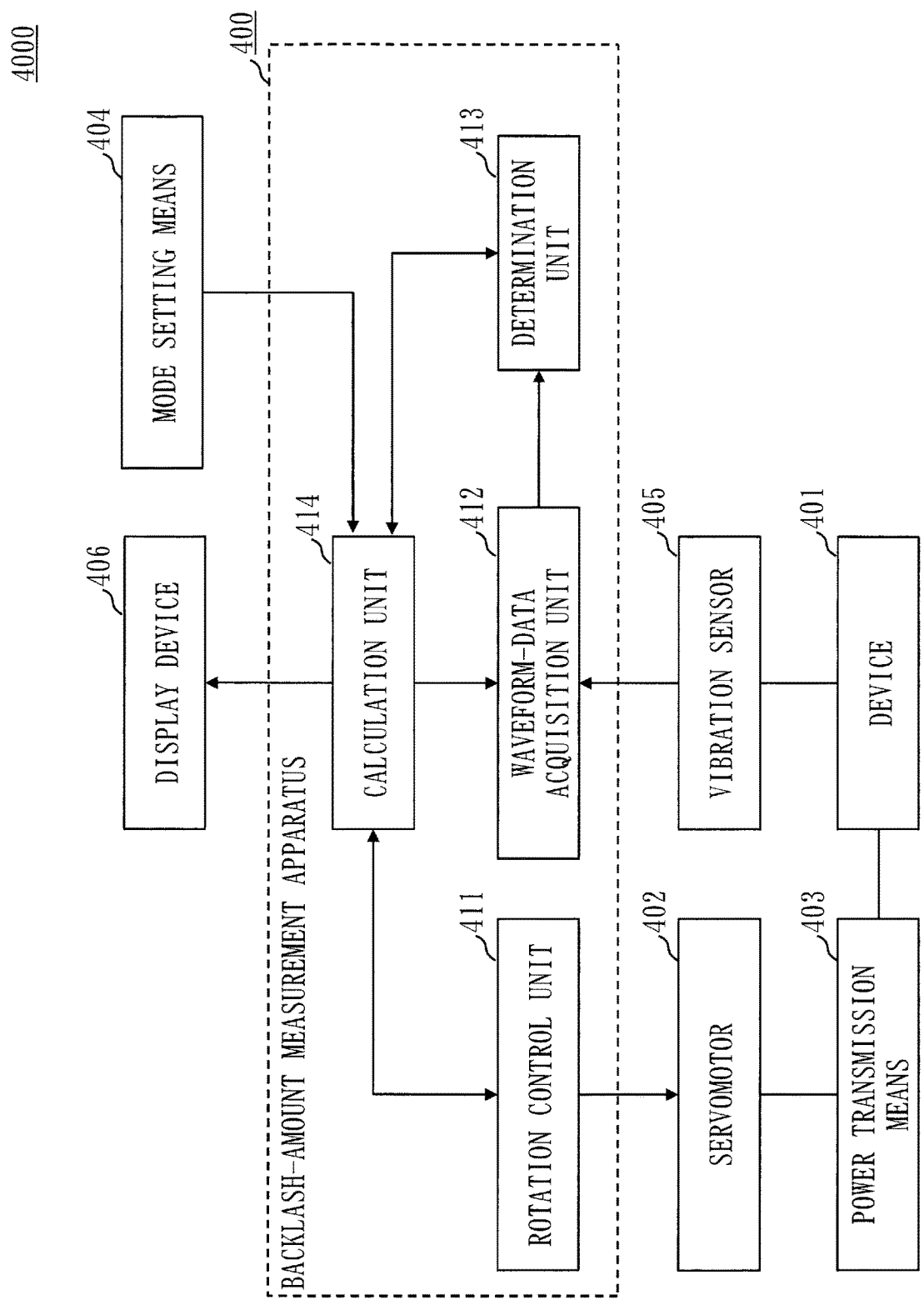
FIG. 8 is a configuration diagram illustrating configurations of an FA system 4000 and a backlash-amount measurement apparatus 400 according to a fourth embodiment.

FIG. 8 is a configuration diagram illustrating configurations of an FA system 4000 and the backlash-amount measurement apparatus 400 according to the fourth embodiment.

The FA system 4000 is production equipment for products and includes the backlash-amount measurement apparatus 400, a device 401, a servomotor 402, a power transmission means 403, a mode setting means 404, a vibration sensor 405, and a display device 406. Further, the backlash-amount measurement apparatus 400 includes a rotation control unit 411, a waveform-data acquisition unit 412, a determination unit 413, and a calculation unit 414.

The display device 406 performs displaying for the user based on a control signal received from the calculation unit 414. A display or the like is adopted as the display device 406.

In the fourth embodiment,
the calculation unit 414 determines whether or not the sum of the rotation amount of the servomotor 402 in the repetition process is equal to or larger than a third threshold value, in each search process, and when it is determined that the sum of the rotation amount of the servomotor 402 is equal to or larger than the third threshold value, ends the repetition process regardless of whether or not the determination unit 413 determines that the rotation of the servomotor 402 has been transmitted to the device 401.

Further, when it is determined that the sum of the rotation amount of the servomotor 402 is equal to or larger than the third threshold value, the calculation unit 414 transmits the control signal which causes the display device 406 to display the warning. Here, displaying the warning is, for example, to display a warning indicating that the backlash amount cannot be measured, to display a warning that prompts an overhaul of the production equipment, or the like.

Next, with use of FIG. 9, an operation of the backlash-amount measurement apparatus 400 according to the fourth embodiment will be described.

Figure 9:
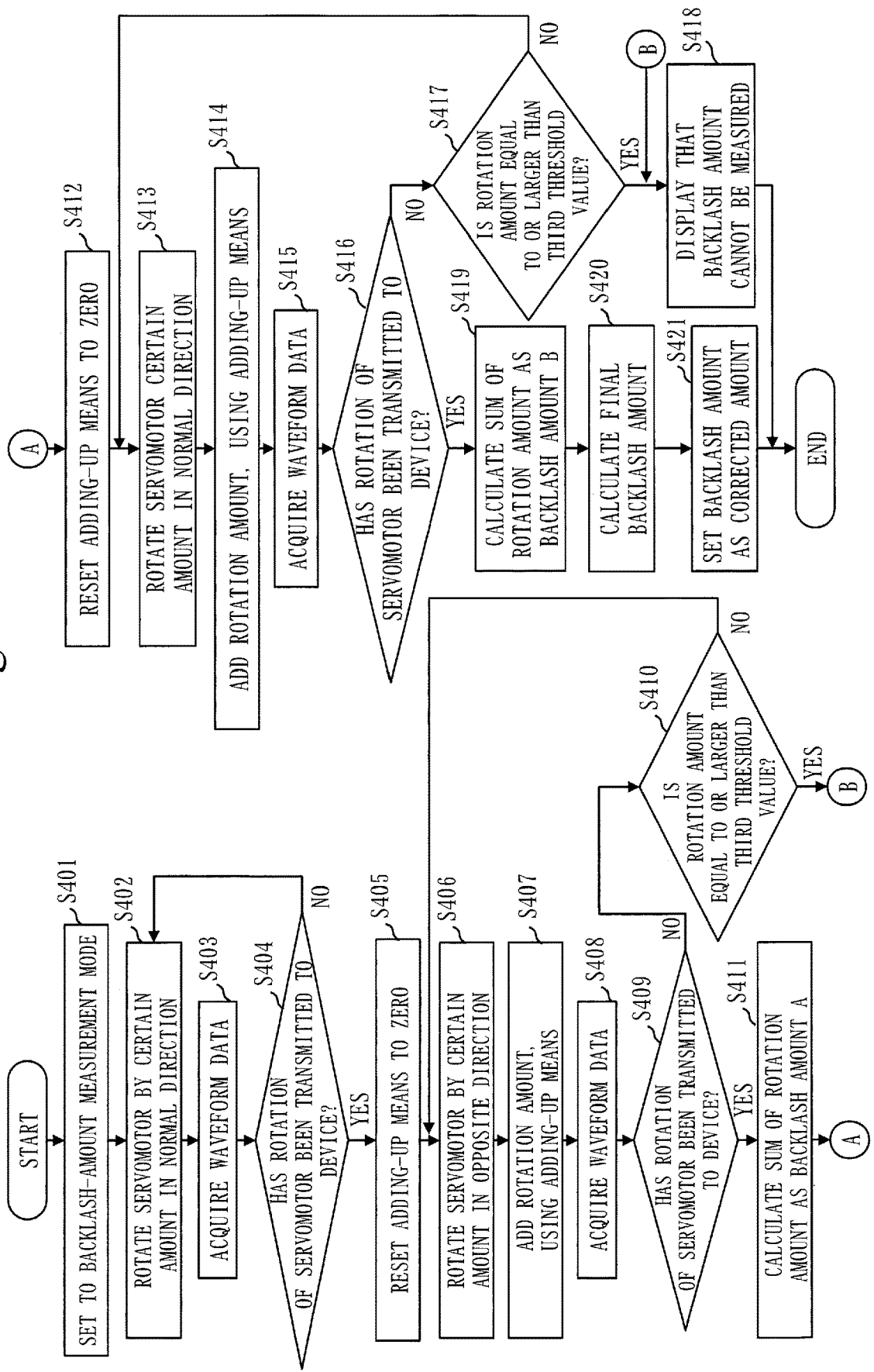
FIG. 9 is flowcharts illustrating an operation of the backlash-amount measurement apparatus 400 according to the fourth embodiment.

FIG. 9 is flowcharts illustrating the operation of the backlash-amount measurement apparatus 400 according to the fourth embodiment.

A matter different from the operation of the backlash-amount measurement apparatus 100 according to the first embodiment is mainly that when it is determined as NO in step S409, the process does not directly return to step S406, and step S410 is performed in between. Similarly, an operation of step S417 is performed between steps S416 and S413.

When it is determined as NO in step S409, the calculation unit 414 determines whether or not the sum of the rotation amount of the servomotor 402 in the repetition process is equal to or larger than the third threshold value, in step S410. Here, when the calculation unit 414 determines that the sum of the rotation amount is equal to or larger than the third threshold value, the process proceeds to step S418. When the calculation unit 414 determines that the sum of the rotation amount is smaller than the third threshold value, the process returns to step S406. Operations in steps S416 and S417 are the same as those in steps S409 and S410 respectively.

When the process proceeds to YES after step S410 or step S417, the calculation unit 414 transmits the control signal to the display device 406 in step S418. Then, upon receiving the control signal from the calculation unit 414, the display device 406 displays the warning for the user.

By the above operation, the backlash-amount measurement apparatus 400 according to the fourth embodiment causes the display device 406 to display the warning, when the backlash amount exceeds the threshold value for correcting the backlash amount. This enables the user to recognize that the abrasion of the power transmission means 403 has become large, and consider the overhaul of the production equipment early.

Further, the technique in the second embodiment may be applied to the fourth embodiment. That is, also in the fourth embodiment, the backlash-amount measurement apparatus 400 may measure the duration of the waveform indicated in the waveform data, and set the measured duration as the waiting time between each search process.

Further, the technique in the third embodiment may be applied to the fourth embodiment. That is, the FA system 4000 may include the sound sensor instead of the vibration sensor 405, and the backlash-amount measurement apparatus 400 may use the sound data as the waveform data.

Fifth Embodiment

Next, a backlash-amount measurement apparatus 500 according to a fifth embodiment will be described.

The backlash-amount measurement apparatuses according to the first to fourth embodiments determine whether or not the rotation of the servomotor has been transmitted to the device on a basis of rules, based on rules in the amplitude and the duration in the waveform data. Meanwhile, in the fifth embodiment, the backlash-amount measurement apparatus 500 will be described which determines whether or not the rotation of the servomotor has been transmitted to the device, using a learned model. This is derived from a consideration on a situation where the power transmission means is so complex that it is not determined whether or not the power of the device has been transmitted from the servomotor based on the amplitude of the vibration or sound waveform, or a length of time until the vibration converges, in automatic setting of the backlash amount.

Figure 10:
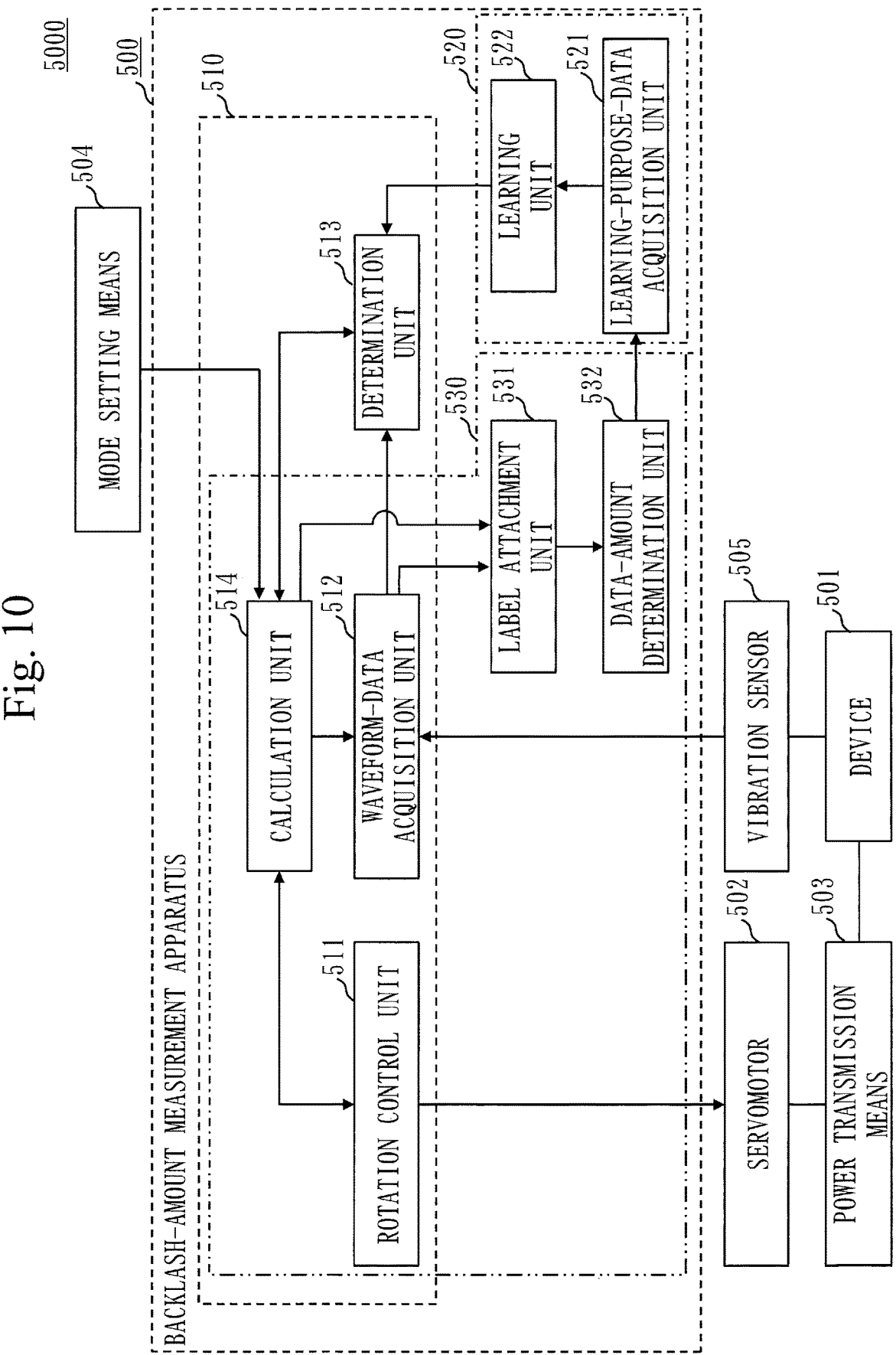
FIG. 10 is a configuration diagram illustrating configurations of an FA system 5000 and a backlash-amount measurement apparatus 500 according to a fifth embodiment.

FIG. 10 is a configuration diagram illustrating configurations of an FA system 5000 and the backlash-amount measurement apparatus 500 according to the fifth embodiment.

An FA system 5000 is production equipment for products and includes the backlash-amount measurement apparatus 500, a device 501, a servomotor 502, a power transmission means 503, a mode setting means 504, a vibration sensor 505, and a display device.

In the fifth embodiment, the backlash-amount measurement apparatus 500 includes a rotation control unit 511, a waveform-data acquisition unit 512, a determination unit 513, a calculation unit 514, a learning-purpose-data acquisition unit 521, a learning unit 522, a label attachment unit 531, and a data-amount determination unit 532. Here, the rotation control unit 511, the waveform-data acquisition unit 512, the determination unit 513, and the calculation unit 514 constitute a utilization unit 510. Further, the learning-purpose-data acquisition unit 521 and the learning unit 522 constitute a learned-model generation unit 520. Further, the rotation control unit 511, the waveform-data acquisition unit 512, the calculation unit 514, the label attachment unit 531, and the data-amount determination unit 532 constitute a learning-purpose-data generation unit 530.

Figure 11:
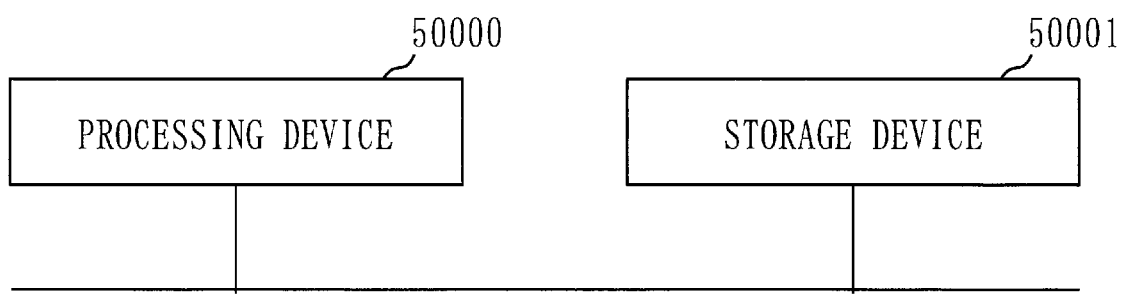
FIG. 11 is a configuration diagram illustrating an example of a hardware configuration of a computer which realizes the backlash-amount measurement apparatus 500, according to the fifth embodiment.

Next, a hardware configuration of the backlash-amount measurement apparatus 500 according to the fifth embodiment will be described. Each function of the backlash-amount measurement apparatus 500 is realized by a computer. FIG. 11 is a configuration diagram illustrating an example of a hardware configuration of the computer which realizes the backlash-amount measurement apparatus 500, according to the fifth embodiment.

Hardware illustrated in FIG. 11 includes a processing device 50000 such as a CPU (Central Processing Unit), and a storage device 50001 such as a ROM (Read Only Memory) or a hard disk.

The rotation control unit 511, the waveform-data acquisition unit 512, the determination unit 513, the calculation unit 514, the learning-purpose-data acquisition unit 521, the learning unit 522, the label attachment unit 531, and the data-amount determination unit 532 which are illustrated in FIG. 10 are realized by the processing device 50000 executing a program stored in the storage device 50001. Further, a function that the learning unit 522 stores a learned model and a function that the data-amount determination unit 532 stores learning-purpose data are realized by the storage device 50001. Here, the above-described configuration is not limited to a configuration realized by a single processing device 50000 and a single storage device 50001, and may be a configuration realized by a plurality of processing devices 50000 and a plurality of storage devices 50001.

A method of realizing each function of the backlash-amount measurement apparatus 500 is not limited to the above-described combination of hardware and program, and may be realized by only hardware such as an LSI (Large Scale Integrated Circuit) obtained by implementing the program in the processing device. Alternatively, a part of the functions may be realized by dedicated hardware, and the other part of the functions may be realized by a combination of processing device and program.

The backlash-amount measurement apparatus 500 according to the fifth embodiment is constituted as above.

Below, the utilization unit 510, the learned-model generation unit 520, and the learning-purpose-data generation unit 530 will be described in a utilization phase, a learning phase, and a learning-purpose-data generation phase respectively.

<Utilization Phase>

First, the utilization unit 510 which measures the backlash amount, using an after-learning learned model will be described.

In the fifth embodiment, the determination unit 513 determines whether or not the rotation of the servomotor 502 has been transmitted to the device 501, based on the waveform data, using the learned model. That is, the determination unit 513 acquires the after-learning learned model from the learning unit 522 which will be described later, and determines whether or not the power of the servomotor 502 has been transmitted to the device 501, by inputting the waveform data into this learned model.

Here, the learned model used by the determination unit 513 is assumed to be obtained from learning of supervised learning. More specifically, the learned model outputs consistency information indicating whether or not the input waveform data is consistent with the waveform data which is obtained in advance from the learning conducted when the power of the servomotor 502 has been transmitted to the device 501. When the pieces of waveform data are consistent with each other, the learned model outputs the consistency information indicating "consistent". When the pieces of waveform data are inconsistent with each other, the learned model outputs the consistency information indicating "inconsistent". Here, "consistent" is the same meaning as "transmission", and "inconsistent" is the same meaning as "non-transmission". Further, here, an act of determining whether or not the waveform data is consistent with the waveform data obtained in advance from the learning is referred to as waveform determination.

Further, for the consistency in the waveform determination, the pieces of waveform data do not need to be identical to each other precisely. When the types of waveforms indicated in the pieces of waveform data are the same, it is possible to conclude as "consistent". Also, when the types of waveforms are different from each other, it is possible to conclude as "inconsistent". Here, as the types of the waveform, there are two types, namely, the waveform obtained when the power of the servomotor 502 has been transmitted to the device 501, and the waveform obtained when the power of the servomotor 502 has not been transmitted to the device 501.

That is, when the input waveform data is consistent with the waveform data which is obtained in advance from the learning conducted when the power of the servomotor 502 has been transmitted to the device 501, the determination unit 513 outputs a determination result indicating "transmission" which represents that the power has been transmitted. Further, when the input waveform data is not consistent with the waveform data which is obtained in advance from the learning conducted when the power of the servomotor 502 has been transmitted to the device 501, or when the input waveform data is consistent with the waveform data which is obtained in advance from the learning conducted when the power of the servomotor 502 has not been transmitted to the device 501, the determination unit 513 outputs a determination result indicating "non-transmission" which represents that the power has not been transmitted.

In the above, it is described that the determination unit 513 determines the waveform, using the learned model obtained from the learning by the learning unit 522 of the backlash-amount measurement apparatus 500. However, the learned model may be acquired from the outside such as another learning device, and the determination unit 513 may determine the waveform based on this learned model.

The utilization unit 510 is constituted as above.

Next, with use of FIG. 12, an operation of measuring the backlash amount by the utilization unit 510 will be described.

Figure 12:
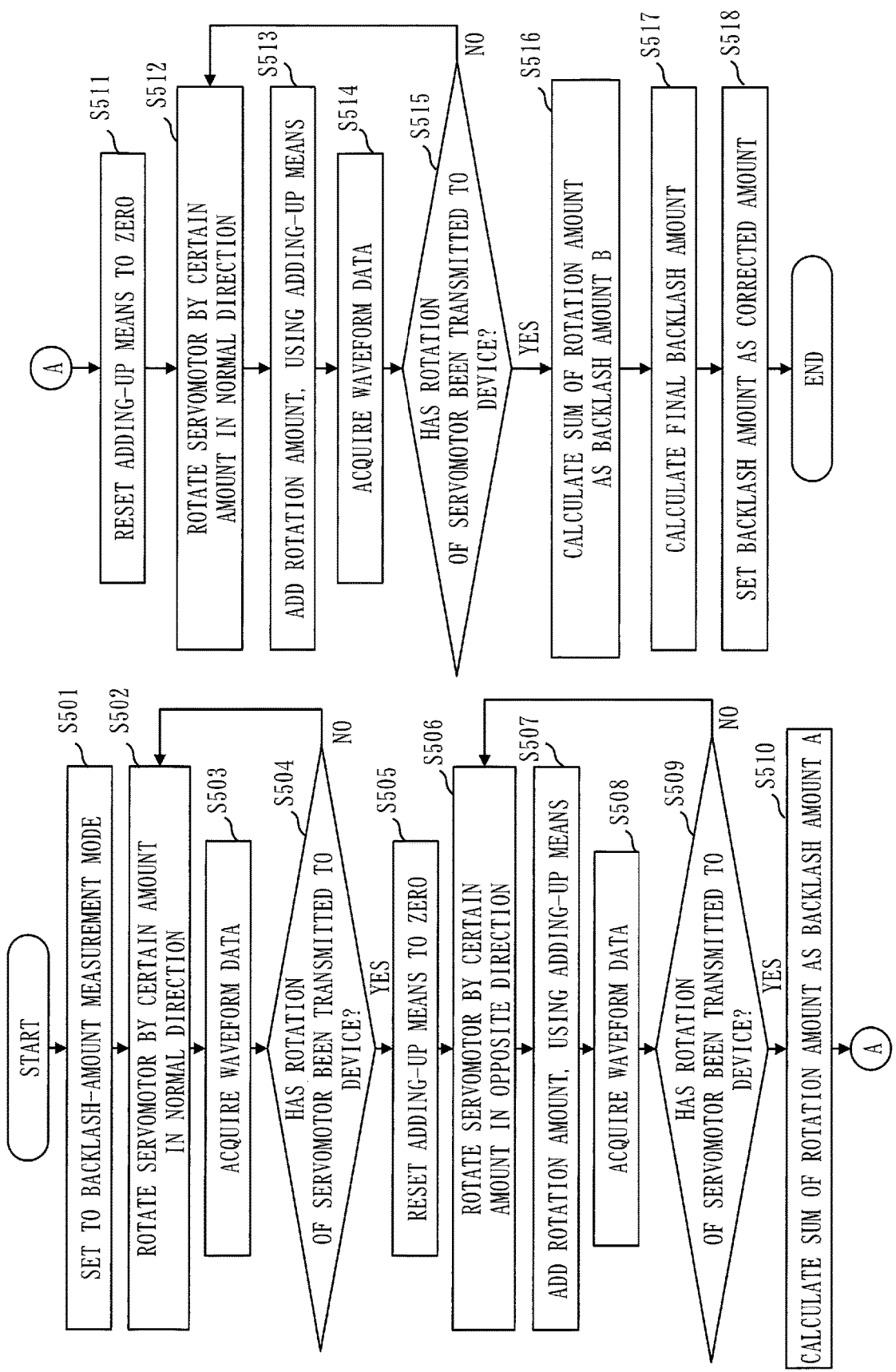
FIG. 12 is flowcharts illustrating an operation of measuring a backlash amount by a utilization unit 510, according to the fifth embodiment.

FIG. 12 is flowcharts illustrating the operation of measuring the backlash amount by the utilization unit 510, according to the fifth embodiment.

In steps S504, S509, and S515, the utilization unit 510 determines whether or not the rotation of the servomotor 502 has been transmitted to the device 501, by inputting the waveform data into the leaned model.

Since the other operations are the same as those in the first embodiment, descriptions will be omitted.

By the above-described operation, the backlash-amount measurement apparatus 500 according to the fifth embodiment determines whether or not the rotation of the servomotor 502 has been transmitted to the device 501, with use of the learned model. Therefore, it is possible to measure the backlash amount highly accurately even in a case where the power transmission means 503 is so complex that the transmission of the power from the servomotor 502 to the device 501 cannot be determined based on the amplitude of the vibration or sound waveform, or a length of time until the vibration converges.

<Learning Phase>

Next, the learned-model generation unit 520 which generates the after-learning learned model will be described.

The learning-purpose-data acquisition unit 521 acquires as learning-purpose data, the waveform data obtained when the servomotor 502 connected to the device 501 via the power transmission means 503 is rotated, and the consistency information indicating whether or not the rotation of the servomotor 502 has been transmitted to the device 501. That is, the learning-purpose-data acquisition unit 521 acquires as the learning-purpose data, the waveform data to which the consistency information is attached.

The learning unit 522 generates with use of the learning-purpose data, the learned model for determining whether or not the rotation of the servomotor 502 has been transmitted to the device 501, based on the waveform data obtained when the servomotor 502 is rotated.

That is, the learning unit 522 performs learning for the learned model, based on the learning-purpose data input from the learning-purpose-data acquisition unit 521. Further, before the learning, the learning unit 522 stores a before-learning learned model in advance. After the learning, the learning unit 522 stores the after-learning learned model.

As learning algorithm used by the learning unit 522, publicly-known algorithm such as supervised learning, unsupervised learning, or reinforcement learning can be used. As an example, a case where a neural network is adopted will be described.

The learning unit 522 learns the determination on the waveform data, for example, by so-called supervised learning, according to a neural network model. Here, the supervised learning is a method of providing a learning device with a pair of input data and result (label) data, and causing the learning device to learn characteristics in the learning-purpose data and to infer the result from the input.

The neural network is constituted by an input layer configured with a plurality of neurons, an intermediate layer (hidden layer) configured with a plurality of neurons, and an output layer configured with a plurality of neurons. The intermediate layer may be one, two, or more layers.

Figure 13:
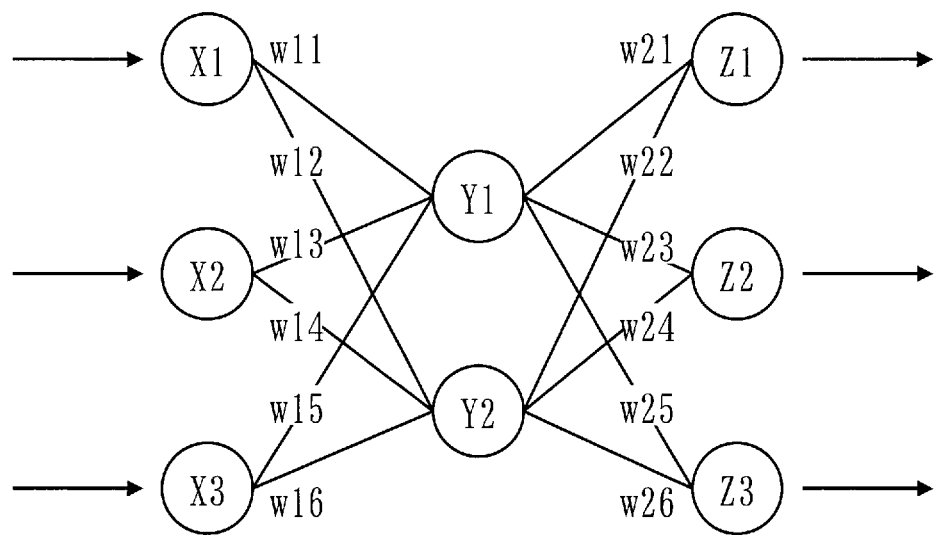
FIG. 13 is a conceptual diagram illustrating a specific example of a learned model according to the fifth embodiment.

For example, in the neural network having three layers as illustrated in FIG. 13, when a plurality of inputs are input into input layers (X1 to X3), the values are multiplied by weight W1 (w11 to w16) and then the results are input into intermediate layers (Y1 to Y2). Then, the results are further multiplied by weight W2 (w21 to w26) and then output from output layers (Z1 to Z3). These output results vary depending on values of the weight W1 and the weight W2.

In the present embodiment, the neural network learns the waveform determination, by the so-called supervised learning, according to the combination of vibration data and consistency information which are the learning-purpose data acquired by the learning-purpose-data acquisition unit 521.

That is, the neural network learns, by adjusting the weight W1 and the weight W2 so that the results output from the output layers after inputting into the input layers, the vibration data which is the learning data become close to the consistency information corresponding to the input waveform data.

The learning unit 522 generates the after-learning learned model by the above-described operation, and outputs the after-learning learned model.

Next, with use of FIG. 14, a process that the learned-model generation unit 520 generates the after-learning learned model will be described.

Figure 14:
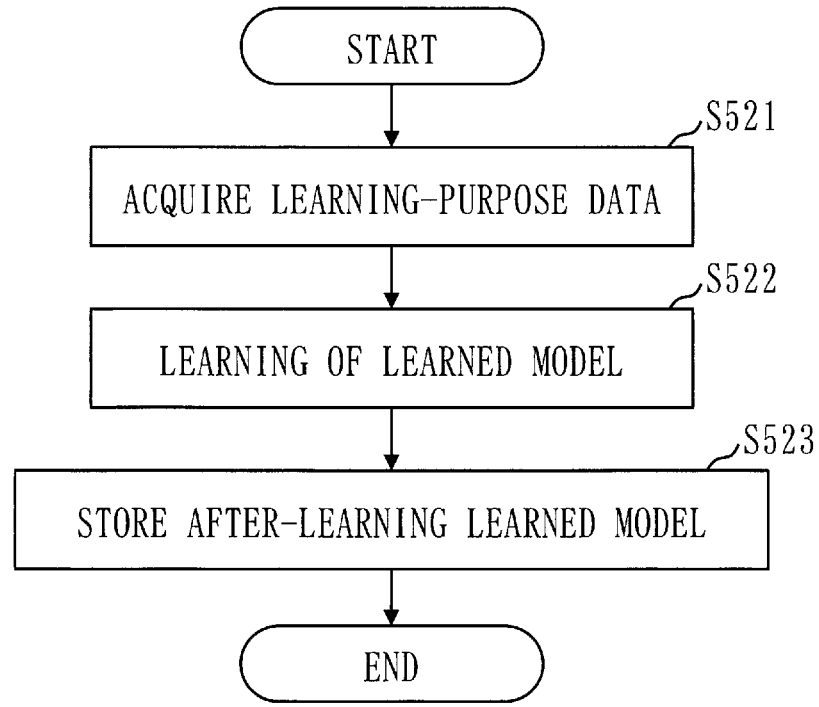
FIG. 14 is a flowchart illustrating an operation of a learned-model generation unit 520 according to the fifth embodiment.

FIG. 14 is a flowchart illustrating an operation of the learned-model generation unit 520 according to the fifth embodiment.

Further, below, the operation of the learned-model generation unit 520 corresponds to an after-learning-learned-model generation method, and a program which causes the computer to execute the operation of the learned-model generation unit 520 corresponds to an after-learning-learned-model generation program. Further, an operation of the learning-purpose-data acquisition unit 521 corresponds to a learning-purpose-data acquisition step, and an operation of the learning unit 522 corresponds to a learning step.

In step S521, the learning-purpose-data acquisition unit 521 acquires the learning-purpose data in which the vibration data and the consistency information are associated with each other. Note that, it is premised that the vibration data and the consistency information are acquired at the same time. However, it is sufficient if the vibration data and the consistency information are input with an association with each other, Therefore, each of the vibration data and the consistency information may be acquired at different timings.

In step S522, the learning unit 522 learns the waveform determination, by the so-called supervised learning, according to the learning-purpose data acquired in step S521, and generates the after-learning learned model.

In step S523, the learning unit 522 stores the after-learning learned model generated by the learning unit 522.

<Learning-Purpose-Data Generation Phase>

Next, the learning-purpose-data generation unit 530 which generates the learning-purpose data to be used for the learning will be described.

In the above, the utilization unit 510 and the learned-model generation unit 520 are described. Here, the learning-purpose-data generation unit 530 for generating the learning-purpose data to be input into the learned-model generation unit 520 will be described.

The learning-purpose-data generation unit 530 shares the rotation control unit 511, the waveform-data acquisition unit 512, and the calculation unit 514 with the utilization unit 510.

The label attachment unit 531 attaches a label to the waveform data and generates the learning-purpose data. More specifically, the label attachment unit 531 generates the learning-purpose data by attaching to the waveform data, a non-transmission label indicating that the waveform data is obtained when the rotation of the servomotor 502 has not been transmitted to the device 501, when the rotation amount of the servomotor 502 does not exceed a preset backlash amount, and by attaching to the waveform data, a transmission label indicating that the waveform data is obtained when the rotation of the servomotor 502 has been transmitted to the device 501, when the rotation amount of the servomotor 502 exceeds the backlash amount. Here, the transmission label and the non-transmission label are equivalent to the consistency information. The transmission label is equivalent to "consistent" described in the utilization phase. The non-transmission label is equivalent to "inconsistent" described in the utilization phase.

Further, the label attachment unit 531 outputs the generated learning-purpose data to the data-amount determination unit 532.

The data-amount determination unit 532 determines whether or not a sufficient amount of learning-purpose data generated by the label attachment unit 531 has been collected. For example, the data-amount determination unit 532 determines whether or not the enough amount of learning-purpose data has been collected, by determining whether or not the number of bytes of the learning-purpose data which has been input reaches the certain number of bytes. Further, the data-amount determination unit 532 stores the learning-purpose data which has been input, and outputs the learning-purpose data to the learning-purpose-data acquisition unit 521 according to a request from the learning-purpose-data acquisition unit 521.

In the initial adjustment of the FA system 5000, the user measures the backlash amount of the production equipment, using a dial gauge or the like, and stores the measured backlash amount in the label attachment unit 531 in advance.

Next, with use of FIG. 15, an operation of generating the learning-purpose data by the learning-purpose-data generation unit 530 will be described.

Figure 15:
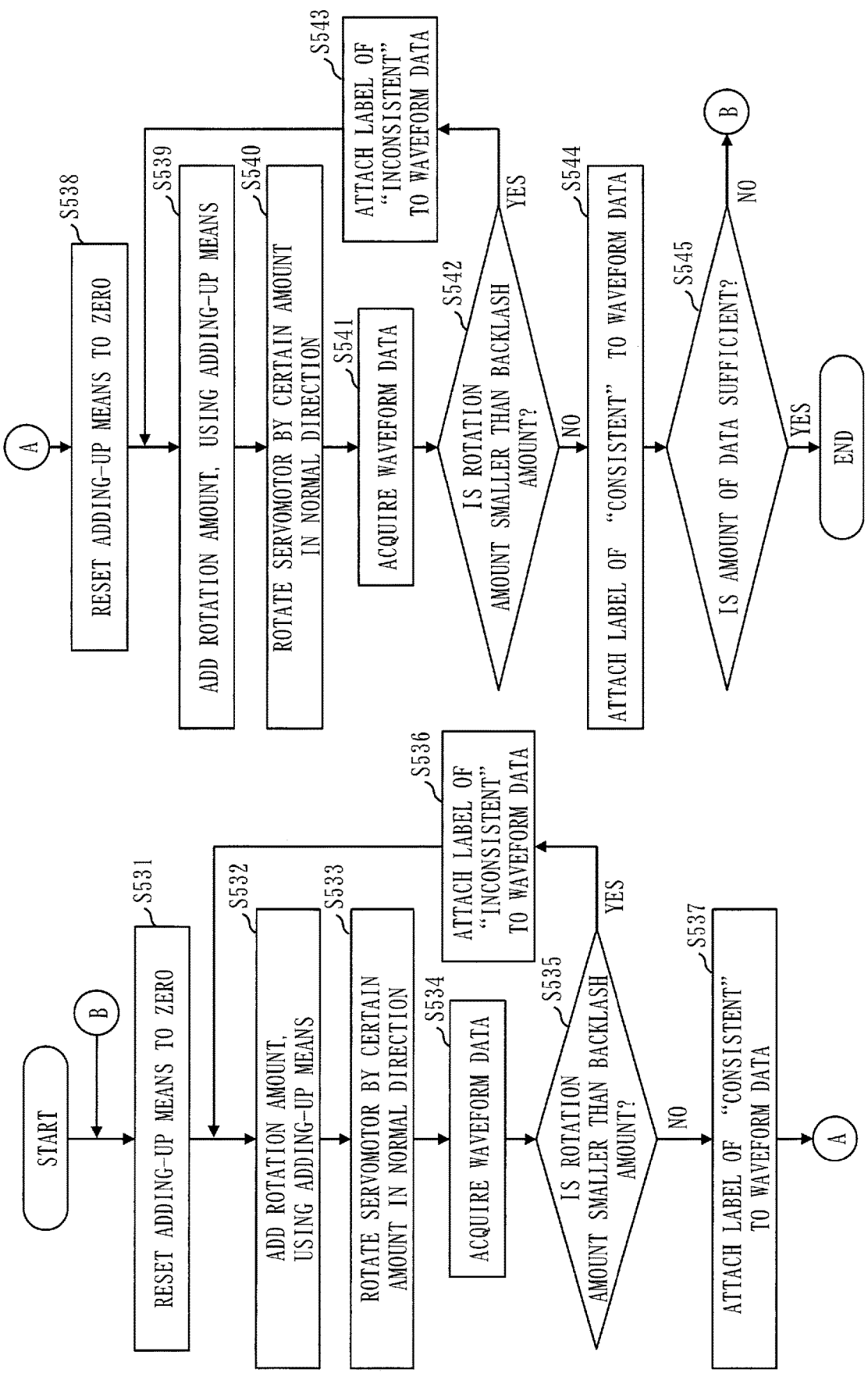
FIG. 15 is flowcharts illustrating an operation of a learning-purpose-data generation unit 530 according to the fifth embodiment.

FIG. 15 is flowcharts illustrating the operation of the learning-purpose-data generation unit 530 according to the fifth embodiment.

Further, below, the operation of the learning-purpose-data generation unit 530 corresponds to a learning-purpose-data generation method, and a program which causes the computer to execute the operation of the learning-purpose-data generation unit 530 corresponds to a learning-purpose-data generation program. Further, an operation of the label attachment unit 531 corresponds to a label attachment step, and an operation of the data-amount determination unit 532 corresponds to a data-amount determination step.

In step S531, the calculation unit 514 resets the built-in adding-up means to zero.

In step S532, the calculation unit 514 adds to the adding-up means, a rotation amount to be instructed in step S533. Further, the calculation unit 514 reads a value of the adding-up means and outputs to the label attachment unit 531, information indicating the sum of the rotation amount of the servomotor 502.

In step S533, the rotation control unit 511 rotates the servomotor 502 by the certain amount in the normal direction.

In step S534, the waveform-data acquisition unit 512 acquires waveform data obtained when the servomotor 502 is rotated by the certain amount in step S533. The waveform-data acquisition unit 512 outputs the acquired waveform data to the label attachment unit 531.

In step S535, the label attachment unit 531 compares the sum of the rotation amount indicated in the information input from the calculation unit 514, with the backlash amount recorded in advance. When the sum of the rotation amount is smaller than the backlash amount, the process proceeds to step S536. Then, the label attachment unit 531 generates the learning-purpose data by attaching to the waveform data, the consistency information indicating "inconsistent". After that, the process returns to step S532.

When the sum of the rotation amount is equal to or larger than the backlash amount in step S535, the process proceeds to step S537. Then, the label attachment unit 531 generates the learning-purpose data by attaching to the waveform data, the consistency information indicating "consistent".

In step S538, the calculation unit 514 resets the built-in adding-up means to zero.

In step S539, the calculation unit 514 adds to the adding-up means, the rotation amount to be instructed in step S540. Further, the calculation unit 514 reads a value of the adding-up means and outputs to the label attachment unit 531, information indicating the sum of the rotation amount of the servomotor 502.

In step S540, the rotation control unit 511 rotates the servomotor 502 by the certain amount in the opposite direction.

In step S541, the waveform-data acquisition unit 512 acquires the waveform data obtained when the servomotor 502 is rotated by the certain amount in step S540. The waveform-data acquisition unit 512 outputs the acquired waveform data to the label attachment unit 531.

In step S542, the label attachment unit 531 compares the sum of the rotation amount indicated in the information input from the calculation unit 514, with the backlash amount recorded in advance. When the sum of the rotation amount is smaller than the backlash amount, the label attachment unit 531 generates the learning-purpose data by attaching to the waveform data, the consistency information indicating "inconsistent", in step S543. After that, the process returns to step S539.

When the sum of the rotation amount is not smaller than the backlash amount in step S542, the process proceeds to step S544. Then, the label attachment unit 531 generates the learning-purpose data by attaching to the waveform data, the consistency information indicating "consistent".

In step S545, the data-amount determination unit 532 determines whether or not a certain amount of learning-purpose data accumulated has been collected. When the data-amount determination unit 532 determines that the certain amount has been collected, the learning-purpose-data generation unit 530 ends the operation. When the data-amount determination unit 532 determines that the certain amount has not been collected, the process returns to step S531.

By the operation as above, the learning-purpose-data generation unit 530 can reduce labor to generate the learning-purpose data, by generating the learning-purpose data automatically. Further, it is possible to generate the pieces of learning-purpose data efficiently by alternating the rotation in the normal direction and the rotation in the opposite direction and generating the learning-purpose data at times of both the rotation in the normal direction and the rotation in the opposite direction.

Below, a modification example of the backlash-amount measurement apparatus 500 according to the fifth embodiment will be described.

In the above, a case where the supervised learning is applied as the learning algorithm is described. However, the learning algorithm is not limited to this. Instead of the supervised learning, the reinforcement learning, the unsupervised learning, semi-supervised learning, or the like can be applied as the learning algorithm.

Further, the learned-model generation unit 520 may learn the waveform determination according to pieces of learning-purpose data generated by a plurality of backlash-amount measurement apparatuses 500. Note that, the learned-model generation unit 520 may acquire the pieces of learning-purpose data from the plurality of backlash-amount measurement apparatuses 500 used in the same area, or may use the pieces of learning-purpose data collected from the plurality of backlash-amount measurement apparatuses 500 each of which operates independently in different area, to learn the waveform determination. Further, it is possible to add/remove the backlash-amount measurement apparatus 500 which collects the learning-purpose data to/from a subject during the process. Furthermore, a learned model which has been used for learning the waveform determination in one backlash-amount measurement apparatus 500 may be applied to a different backlash-amount measurement apparatus 500 from this, and the waveform determination may be learned again to update the learned model in the different backlash-amount measurement apparatus.

Further, as the learning algorithm used by the learning unit 522, deep learning (Deep Learning) which learns extraction of a feature itself may be used, and machine learning may be executed according to another publicly-known method such as genetic programming, inductive programming, or a support-vector machine, for example.

Further, in the above, a configuration having a single backlash-amount measurement apparatus 500 including the utilization unit 510, the learned-model generation unit 520, and the learning-purpose-data generation unit 530 is described. However, a different configuration is acceptable such as a configuration having each unit in a different apparatus, like a configuration with a utilization apparatus, an after-learning-learned-model generation apparatus, and a learning-purpose-data generation apparatus, for example. Further, another configuration having each unit on a cloud server is also acceptable.

Further, the technique in the second embodiment may be applied to the fifth embodiment. That is, also in the fifth embodiment, the backlash-amount measurement apparatus 500 may measure the duration of the waveform indicated in the waveform data, and set the measured duration as the waiting time between each search process.

Further, the technique in the third embodiment may be applied to the fifth embodiment. That is, the FA system 5000 may include the sound sensor instead of the vibration sensor 505, and the backlash-amount measurement apparatus 500 may use the sound data as the waveform data.

INDUSTRIAL APPLICABILITY

The backlash-amount measurement apparatus according to the present disclosure is suitable to be used in an FA system.

REFERENCE SIGNS LIST 100, 200, 300, 400, 500: backlash-amount measurement apparatus, 1000, 2000, 3000, 4000, 5000: FA system, 11, 211, 311, 411, 511: rotation control unit, 12, 212, 312, 412, 512: waveform-data acquisition unit, 13, 213, 313, 413, 513: determination unit, 14, 214, 314, 414, 514: calculation unit, 215: duration measurement unit, 510: utilization unit, 520: learned-model generation unit, 521: learning-purpose-data acquisition unit, 522: learning unit, 530: learning-purpose-data generation unit, 531: label attachment unit, 532: data-amount determination unit, 1, 201, 301, 401, 501: device, 2, 202, 302, 402, 502: servomotor, 3, 203, 303, 403, 503: power transmission means, 4, 204, 304, 404, 504: mode setting means, 5, 205, 405, 505: vibration sensor, 305: sound sensor, 406: display device, 10000, 50000: processing device, 10001, 50001: storage device.

The invention claimed is:

1. A backlash-amount measurement apparatus comprising:
processing circuitry
to perform a rotation process of rotating by a certain amount, a servomotor which is connected to a device via a power transmission means;
to perform a waveform-data acquisition process of acquiring waveform data obtained when the servomotor is rotated by the certain amount by the rotation process;
to perform a determination process of determining whether or not rotation has been transmitted to the device when the servomotor is rotated by the certain amount by the rotation process, based on the waveform data;
to cause a repetition process of repeating a search process to be executed, the search process being constituted by the rotation process, the waveform-data acquisition process, and the determination process, when it is determined that the rotation of the servomotor has not been transmitted to the device in the determination process, to end the repetition process when it is determined that the rotation of the servomotor has been transmitted to the device in the determination process, and to calculate as a backlash amount of the power transmission means, a sum of a rotation amount in the repetition process, the rotation amount being an amount by which the servomotor has been rotated in the rotation process;
to measure duration of waveform indicated in the waveform data when it is determined that the rotation of the servomotor has not been transmitted to the device; and
to set the duration as waiting time after the search process is executed and until the next search process is executed, in the repetition process.

2. The backlash-amount measurement apparatus according to claim 1, wherein
the processing circuitry determines that the rotation of the servomotor has been transmitted to the device, when amplitude of a waveform indicated in the waveform data is equal to or larger than a first threshold value and the waveform indicated in the waveform data continues for a period of time equal to or longer than a second threshold value.

3. The backlash-amount measurement apparatus according to claim 1, wherein
the processing circuitry determines whether or not the rotation of the servomotor has been transmitted to the device, based on the waveform data, using a learned model.

4. The backlash-amount measurement apparatus according to claim 1, wherein
the processing circuitry determines whether or not the sum of the rotation amount of the servomotor in the repetition process is equal to or larger than a third threshold value, in each search process, and when it is determined that the sum of the rotation amount of the servomotor is equal to or larger than the third threshold value, ends the repetition process regardless of whether or not it is determined that the rotation of the servomotor has been transmitted to the device.

5. The backlash-amount measurement apparatus according to claim 4, wherein
when it is determined that the sum of the rotation amount of the servomotor is equal to or larger than the third threshold value, the processing circuitry transmits a control signal which causes a display device connected to the backlash-amount measurement apparatus, to display a warning.

6. A backlash-amount measurement apparatus comprising:
processing circuitry
to perform a rotation process of rotating by a certain amount, a servomotor which is connected to a device via a power transmission means;
to perform a waveform-data acquisition process of acquiring waveform data obtained when the servomotor is rotated by the certain amount by the rotation process;
to perform a determination process of determining whether or not rotation has been transmitted to the device when the servomotor is rotated by the certain amount by the rotation process, based on the waveform data;
to cause a repetition process of repeating a search process to be executed, the search process being constituted by the rotation process, the waveform-data acquisition process, and the determination process, when it is determined that the rotation of the servomotor has not been transmitted to the device in the determination process, to end the repetition process when it is determined that the rotation of the servomotor has been transmitted to the device in the determination process, and to calculate as a backlash amount of the power transmission means, a sum of a rotation amount in the repetition process, the rotation amount being an amount by which the servomotor has been rotated in the rotation process; and
to acquire as the waveform data, vibration data indicating vibration of the device, detected by a vibration sensor connected to the device.

7. The backlash-amount measurement apparatus according to claim 6, wherein
the processing circuitry determines that the rotation of the servomotor has been transmitted to the device, when amplitude of a waveform indicated in the waveform data is equal to or larger than a first threshold value and the waveform indicated in the waveform data continues for a period of time equal to or longer than a second threshold value.

8. The backlash-amount measurement apparatus according to claim 6, wherein
the processing circuitry determines whether or not the rotation of the servomotor has been transmitted to the device, based on the waveform data, using a learned model.

9. The backlash-amount measurement apparatus according to claim 6, wherein
the processing circuitry determines whether or not the sum of the rotation amount of the servomotor in the repetition process is equal to or larger than a third threshold value, in each search process, and when it is determined that the sum of the rotation amount of the servomotor is equal to or larger than the third threshold value, ends the repetition process regardless of whether or not it is determined that the rotation of the servomotor has been transmitted to the device.

10. The backlash-amount measurement apparatus according to claim 9, wherein
when it is determined that the sum of the rotation amount of the servomotor is equal to or larger than the third threshold value, the processing circuitry transmits a control signal which causes a display device connected to the backlash-amount measurement apparatus, to display a warning.

11. A backlash-amount measurement apparatus comprising:
processing circuitry
to perform a rotation process of rotating by a certain amount, a servomotor which is connected to a device via a power transmission means;
to perform a waveform-data acquisition process of acquiring waveform data obtained when the servomotor is rotated by the certain amount by the rotation process;
to perform a determination process of determining whether or not rotation has been transmitted to the device when the servomotor is rotated by the certain amount by the rotation process, based on the waveform data;
to cause a repetition process of repeating a search process to be executed, the search process being constituted by the rotation process, the waveform-data acquisition process, and the determination process, when it is determined that the rotation of the servomotor has not been transmitted to the device in the determination process, to end the repetition process when it is determined that the rotation of the servomotor has been transmitted to the device in the determination process, and to calculate as a backlash amount of the power transmission means, a sum of a rotation amount in the repetition process, the rotation amount being an amount by which the servomotor has been rotated in the rotation process; and
to acquire as the waveform data, sound data indicating operation sound of the device, detected by a sound sensor installed in the vicinity of the device.

12. The backlash-amount measurement apparatus according to claim 11, wherein
the processing circuitry determines that the rotation of the servomotor has been transmitted to the device, when amplitude of a waveform indicated in the waveform data is equal to or larger than a first threshold value and the waveform indicated in the waveform data continues for a period of time equal to or longer than a second threshold value.

13. The backlash-amount measurement apparatus according to claim 11, wherein
the processing circuitry determines whether or not the rotation of the servomotor has been transmitted to the device, based on the waveform data, using a learned model.

14. The backlash-amount measurement apparatus according to claim 11, wherein
the processing circuitry determines whether or not the sum of the rotation amount of the servomotor in the repetition process is equal to or larger than a third threshold value, in each search process, and when it is determined that the sum of the rotation amount of the servomotor is equal to or larger than the third threshold value, ends the repetition process regardless of whether or not it is determined that the rotation of the servomotor has been transmitted to the device.

15. The backlash-amount measurement apparatus according to claim 14, wherein
when it is determined that the sum of the rotation amount of the servomotor is equal to or larger than the third threshold value, the processing circuitry transmits a control signal which causes a display device connected to the backlash-amount measurement apparatus, to display a warning.

16. A backlash-amount measurement method comprising:
performing a rotation process of rotating by a certain amount, a servomotor which is connected to a device via a power transmission means;
performing a waveform-data acquisition process of acquiring waveform data obtained when the servomotor is rotated by the certain amount by the rotation process;
performing a determination process of determining whether or not rotation has been transmitted to the device when the servomotor is rotated by the certain amount by the rotation process, based on the waveform data;
causing a repetition process of repeating a search process to be executed, the search process being constituted by the rotation process, the waveform-data acquisition process, and the determination process, when the determination process determines that the rotation of the servomotor has not been transmitted to the device, ending the repetition process when the determination process determines that the rotation of the servomotor has been transmitted to the device, and calculating as a backlash amount of the power transmission means, a sum of a rotation amount in the repetition process, the rotation amount being an amount by which the rotation process has rotated the servomotor;
measuring duration of waveform indicated in the waveform data when it is determined that the rotation of the servomotor has not been transmitted to the device; and
setting the duration as waiting time after the search process is executed and until the next search process is executed, in the repetition process.

17. A non-transitory computer readable medium storing a backlash-amount measurement program which causes a computer to execute the backlash-amount measurement method described in claim 16.

18. A backlash-amount measurement method comprising:
performing a rotation process of rotating by a certain amount, a servomotor which is connected to a device via a power transmission means;
performing a waveform-data acquisition process of acquiring waveform data obtained when the servomotor is rotated by the certain amount by the rotation process;
performing a determination process of determining whether or not rotation has been transmitted to the device when the servomotor is rotated by the certain amount by the rotation process, based on the waveform data;
causing a repetition process of repeating a search process to be executed, the search process being constituted by the rotation process, the waveform-data acquisition process, and the determination process, when the determination process determines that the rotation of the servomotor has not been transmitted to the device, ending the repetition process when the determination process determines that the rotation of the servomotor has been transmitted to the device, and calculating as a backlash amount of the power transmission means, a sum of a rotation amount in the repetition process, the rotation amount being an amount by which the rotation process has rotated the servomotor; and
acquiring as the waveform data, vibration data indicating vibration of the device, detected by a vibration sensor connected to the device.

19. A non-transitory computer readable medium storing a backlash-amount measurement program which causes a computer to execute the backlash-amount measurement method described in claim 18.

20. A backlash-amount measurement method comprising:
performing a rotation process of rotating by a certain amount, a servomotor which is connected to a device via a power transmission means;
performing a waveform-data acquisition process of acquiring waveform data obtained when the servomotor is rotated by the certain amount by the rotation process;
performing a determination process of determining whether or not rotation has been transmitted to the device when the servomotor is rotated by the certain amount by the rotation process, based on the waveform data;
causing a repetition process of repeating a search process to be executed, the search process being constituted by the rotation process, the waveform-data acquisition process, and the determination process, when the determination process determines that the rotation of the servomotor has not been transmitted to the device, ending the repetition process when the determination process determines that the rotation of the servomotor has been transmitted to the device, and calculating as a backlash amount of the power transmission means, a sum of a rotation amount in the repetition process, the rotation amount being an amount by which the rotation process has rotated the servomotor; and
acquiring as the waveform data, sound data indicating operation sound of the device, detected by a sound sensor installed in the vicinity of the device.

21. A non-transitory computer readable medium storing a backlash-amount measurement program which causes a computer to execute the backlash-amount measurement method described in claim 20.

* * * * *